United States Patent
Kawasaki

(10) Patent No.: US 10,747,481 B2
(45) Date of Patent: Aug. 18, 2020

(54) CONTROL METHOD FOR ACQUIRING DATA

(71) Applicant: CANON KABUSHIKI KAISHA, Tokyo (JP)

(72) Inventor: Keiji Kawasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 16/158,178

(22) Filed: Oct. 11, 2018

(65) Prior Publication Data

US 2019/0114119 A1    Apr. 18, 2019

(30) Foreign Application Priority Data

Oct. 16, 2017 (JP) ................ 2017-200310

(51) Int. Cl.
   *G06F 3/038* (2013.01)
   *G06F 3/12* (2006.01)
   *H04N 1/00* (2006.01)

(52) U.S. Cl.
   CPC .......... *G06F 3/1225* (2013.01); *G06F 3/1205* (2013.01); *G06F 3/1208* (2013.01); *G06F 3/1253* (2013.01); *G06F 3/1276* (2013.01); *H04N 1/0035* (2013.01); *H04N 1/00209* (2013.01); *H04N 1/00408* (2013.01)

(58) Field of Classification Search
   CPC .... G06F 3/1225; G06F 3/1205; G06F 3/1208; G06F 3/1253; G06F 3/1276; H04N 1/0035; H04N 1/00456
   USPC ........ 358/1.15; 715/700, 788, 274, 120, 762
   See application file for complete search history.

(56) References Cited

U.S. PATENT DOCUMENTS

| | | | | |
|---|---|---|---|---|
| 2007/0188807 A1* | 8/2007 | Yamaguchi | ........... | G06F 3/1208 358/1.18 |
| 2011/0292460 A1* | 12/2011 | Kobashi | ............. | H04N 1/00214 358/442 |
| 2014/0078539 A1* | 3/2014 | Kakitsuba | ............. | G06F 3/1204 358/1.13 |
| 2014/0153018 A1* | 6/2014 | Mitsui | ................. | H04N 1/4413 358/1.13 |
| 2014/0293312 A1 | 10/2014 | Fukasawa | | |
| 2015/0124276 A1* | 5/2015 | Harada | ................ | G06F 3/1224 358/1.13 |

FOREIGN PATENT DOCUMENTS

| | | |
|---|---|---|
| EP | 2336872 A2 | 6/2011 |
| JP | 2013-186835 A | 9/2013 |
| JP | 2015170295 A | 9/2015 |
| JP | 2017-033052 A | 2/2017 |
| JP | 2017-134846 A | 8/2017 |

* cited by examiner

*Primary Examiner* — Jamares Q Washington
(74) *Attorney, Agent, or Firm* — Canon U.S.A., Inc. IP Division

(57) ABSTRACT

A control method for an information processing apparatus which comprises a memory that stores a graphical user interface (GUI) application capable of providing a GUI in a case where a driver that does not have a function of providing a GUI is selected, the control method includes causing the GUI application to acquire drawing data generated by a drawing application, acquiring, by the GUI application, at least either of data including information indicating a setting and data including information indicating a capability of the driver, and providing, the GUI application, a first display item.

24 Claims, 24 Drawing Sheets

FIG.3

```
<?xml version="1.0" encoding="utf-8"?>
<PackageInfo xmlns="http://schemas.microsoft.com/windows/DeviceMetadata/PackageInfo/2007/11/">
  <MetadataKey>                                   ~301
    <HardwareIDList>                              ~302
      <HardwareID>DOID:MFP1_abcd</HardwareID>     ~303
      <HardwareID>DOID:MFP2_ijkl</HardwareID>     ~304
    </HardwareIDList>
    :
  </MetadataKey>
</PackageInfo>
```

FIG.4

```
<?xml version="1.0" encoding="utf-8"?>
<SoftwareInfo xmlns="http://schemas.microsoft.com/windows/2010/08/DeviceMetadata/SoftwareInfo">
<DeviceCompanionApplications>  ~401
<Package>
<Identity Name="1234abcd.MFPUtility" Publisher="CN=12345678-abcd-efgh-ijkl-123456789012" />  ~402
<Applications>
:
</Applications>
</Package>
</DeviceCompanionApplications>
</SoftwareInfo>
```

FIG.9

```
<?xml version="1.0" encoding="UTF-8"?>
<psf:PrintCapabilities xmlns:psf="http://schemas.microsoft.com/windows/2003/08/printing/printschemaframework"
    xmlns:xsi="http://www.w3.org/2001/XMLSchema-instance"
    xmlns:xsd="http://www.w3.org/2001/XMLSchema" version="1"
    xmlns:ns0000="http://www.mfpvendor.com/ns/printschema/fax/v100"   ~901
    xmlns:psk="http://schemas.microsoft.com/windows/2003/08/printing/printschemakeywords">
  <psf:ParameterDef name="ns0000:JobFaxNumber">
  ..
  </psf:ParameterDef>
  <psf:ParameterDef name="ns0000:JobRecipientName">
  ..
  </psf:ParameterDef>
  ..
</psf:PrintCapabilities>
```

FIG.10

```xml
<?xml version="1.0" encoding="UTF-8"?>
<psf:PrintCapabilities xmlns:psf="http://schemas.microsoft.com/windows/2003/08/printing/printschemaframework"
    xmlns:xsi="http://www.w3.org/2001/XMLSchema-instance"
    xmlns:xsd="http://www.w3.org/2001/XMLSchema" version="1"
    xmlns:ns0000="http://www.mfpvendor.com/ns/printschema/printer/v100"  ~1001
    xmlns:psk="http://schemas.microsoft.com/windows/2003/08/printing/printschemakeywords" >
<psf:Feature name="psk:PageMediaType">
  <psf:Option name="psk:Plain" constrained="psk:None"> ... </psf:Option>
  <psf:Option name="ns0000:PhotoPaper" constrained="psk:None"> ... </psf:Option>
  ...
</psf:Feature>
<psf:Feature name="psk:JobNUpAllDocumentsContiguously">
  <psf:Option name="ns0000:None" constrained="psk:None"> ... </psf:Option>
  <psf:Option name="ns0000:PagesPerSheet_2" constrained="psk:None"> ... </psf:Option>  ~1002
  ...
</psf:Feature>
<psf:Feature name="ns0000:JobPreview">
  <psf:Option name="ns0000:OFF" constrained="psk:None"> ... </psf:Option>
  ...
</psf:Feature>
<psf:Feature name="ns0000:PageStamp">
  <psf:Option name="ns0000:OFF" constrained="psk:None"> ... </psf:Option>
  ...
</psf:Feature>
<psf:Property name="psk:PageImageableSize">
  <psf:Property name="psk:ImageableSizeWidth"><psf:Value xsi:type="xsd:integer">210000</psf:Value></psf:Property>
  <psf:Property name="psk:ImageableSizeHeight"><psf:Value xsi:type="xsd:integer">297000</psf:Value></psf:Property>
  <psf:Property name="psk:ImageableArea">
    <psf:Property name="psk:OriginWidth"><psf:Value xsi:type="xsd:integer">3400</psf:Value></psf:Property>
    <psf:Property name="psk:OriginHeight"><psf:Value xsi:type="xsd:integer">3000</psf:Value></psf:Property>
    <psf:Property name="psk:ExtentWidth"><psf:Value xsi:type="xsd:integer">203200</psf:Value></psf:Property>
    <psf:Property name="psk:ExtentHeight"><psf:Value xsi:type="xsd:integer">289000</psf:Value></psf:Property>
  </psf:Property>
</psf:Property>
...
</psf:PrintCapabilities>
```

```xml
<?xml version="1.0" encoding="UTF-8"?>
<psf:PrintCapabilities xmlns:psf="http://schemas.microsoft.com/windows/2003/08/printing/printschemaframework"
    xmlns:xsi="http://www.w3.org/2001/XMLSchema-instance"
    xmlns:xsd="http://www.w3.org/2001/XMLSchema" version="1"
    xmlns:ns0000="http://www.mfpvendor.com/ns/printschema/printer/v100"   ~1101
    xmlns:psk="http://schemas.microsoft.com/windows/2003/08/printing/printschemakeywords">
  <psf:Feature name="psk:PageMediaType">
    <psf:Option name="psk:Plain" constrained="psk:None">...</psf:Option>
    <psf:Option name="ns0000:PhotoPaper" constrained="psk:None">...</psf:Option>
    ...
  </psf:Feature>
  <psf:Feature name="psk:JobNUpAllDocumentsContiguously">
    <psf:Option name="ns0000:None" constrained="psk:None">...</psf:Option>
    <psf:Option name="ns0000:PagesPerSheet_2" constrained="psk:None">...</psf:Option>
    ...
  </psf:Feature>
  <psf:Feature name="ns0000:JobPreview">
    <psf:Option name="ns0000:OFF" constrained="psk:None">...</psf:Option>
    ...
  </psf:Feature>
</psf:PrintCapabilities>
```

```
<?xml version="1.0" encoding="UTF-8"?>
<psf:PrintCapabilities xmlns:psf="http://schemas.microsoft.com/windows/2003/08/printing/printschemaframework"
    xmlns:xsi="http://www.w3.org/2001/XMLSchema-instance"
    xmlns:xsd="http://www.w3.org/2001/XMLSchema" version="1"
    xmlns:ns0000="http://schemas.microsoft.com/windows/printing/oemdriverpt/classdriver"  ~1201
    xmlns:psk="http://schemas.microsoft.com/windows/2003/08/printing/printschemakeywords"
    xmlns:ns0001="http://schemas.microsoft.com/windows/2014/11/printing/generatedkeywords">  ~1202
<psf:Feature name="psk:PageMediaType">
    <psf:Option name="psk:Plain" constrained="psk:None">...</psf:Option>
    ..
    ..
</psf:Feature>
..
</psf:PrintCapabilities>
```

```xml
<?xml version="1.0" encoding="UTF-8"?>
<psf:PrintTicket xmlns:psf="http://schemas.microsoft.com/windows/2003/08/printing/printschemaframework"
    xmlns:psk="http://schemas.microsoft.com/windows/2003/08/printing/printschemakeywords"
    xmlns:xsi="http://www.w3.org/2001/XMLSchema-instance" xmlns:xsd="http://www.w3.org/2001/XMLSchema"
    xmlns:ns0000="http://www.mfpvendor.com/ns/printschema/printer/v100" version="1">
  <psf:Feature name="psk:PageMediaType">
    <psf:Option name="psk:Plain">
    </psf:Option>
  </psf:Feature>
  <psf:Feature name="psk:JobNUpAllDocumentsContiguously">
    <psf:Option name="ns0000:None">
    </psf:Option>
    <psf:ScoredProperty name="psk:PagesPerSheet">
      <psf:Value xsi:type="xsd:integer">1</psf:Value>
    </psf:ScoredProperty>
  </psf:Feature>
  <psf:Feature name="psk:PresentationDirection">
    <psf:Option name="ns0000:Right_or_Bottom"/>
  </psf:Feature>
  <psf:Feature name="ns0000:PageStamp">
    <psf:Option name="ns0000:OFF"/>
  </psf:Feature>
  <psf:Feature name="ns0000:JobPreview">
    <psf:Option name="ns0000:ON"/>
  </psf:Feature>
  :
</psf:PrintTicket>
```

FIG.14

```
<?xml version="1.0" encoding="UTF-8"?>
<psf:PrintTicket xmlns:psf="http://schemas.microsoft.com/windows/2003/08/printing/printschemaframework"
    xmlns:psk="http://schemas.microsoft.com/windows/2003/08/printing/printschemakeywords"
    xmlns:xsi="http://www.w3.org/2001/XMLSchema-instance" xmlns:xsd="http://www.w3.org/2001/XMLSchema"
    xmlns:ns0000="http://www.mfpvendor.com/ns/printschema/printer/v100" version="1">
  <psf:Feature name="psk:PageOutputColor">
    <psf:Option name="psk:Color"/>
  </psf:Feature>
  <psf:ParameterInit name="ns0000:JobFaxNumber">
    <psf:Value xsi:type="xsd:integer">123456789</psf:Value>
  </psf:ParameterInit>
  <psf:ParameterInit name="ns0000:JobRecipientName">
    <psf:Value xsi:type="xsd:string">TestUser</psf:Value>
  </psf:ParameterInit>
  ...
</psf:PrintTicket>
```

FIG.15

| FUNCTION | FUNCTION NAME | OPTION |
|---|---|---|
| LAYOUT | JobNUpAllDocumentsContiguously | Off<br>2-on-1 Printing<br>4-on-1 Printing<br>6-on-1 Printing<br>9-on-1 Printing<br>16-on-1 Printing |
| STAMP | PageStamp | Off<br>Confidential<br>SAMPLE<br>Recycle<br>Date<br>Custom |

FIG.16

| NAME | VALUE |
|---|---|
| OPERATION MODE | PRINTER DRIVER |
| EXTENSION FUNCTION_PageStamp | Confidential |
| DRIVER FUNCTION_JobNUpAllDocumentsContiguously | ns0000:PagesPerSheet_2 |

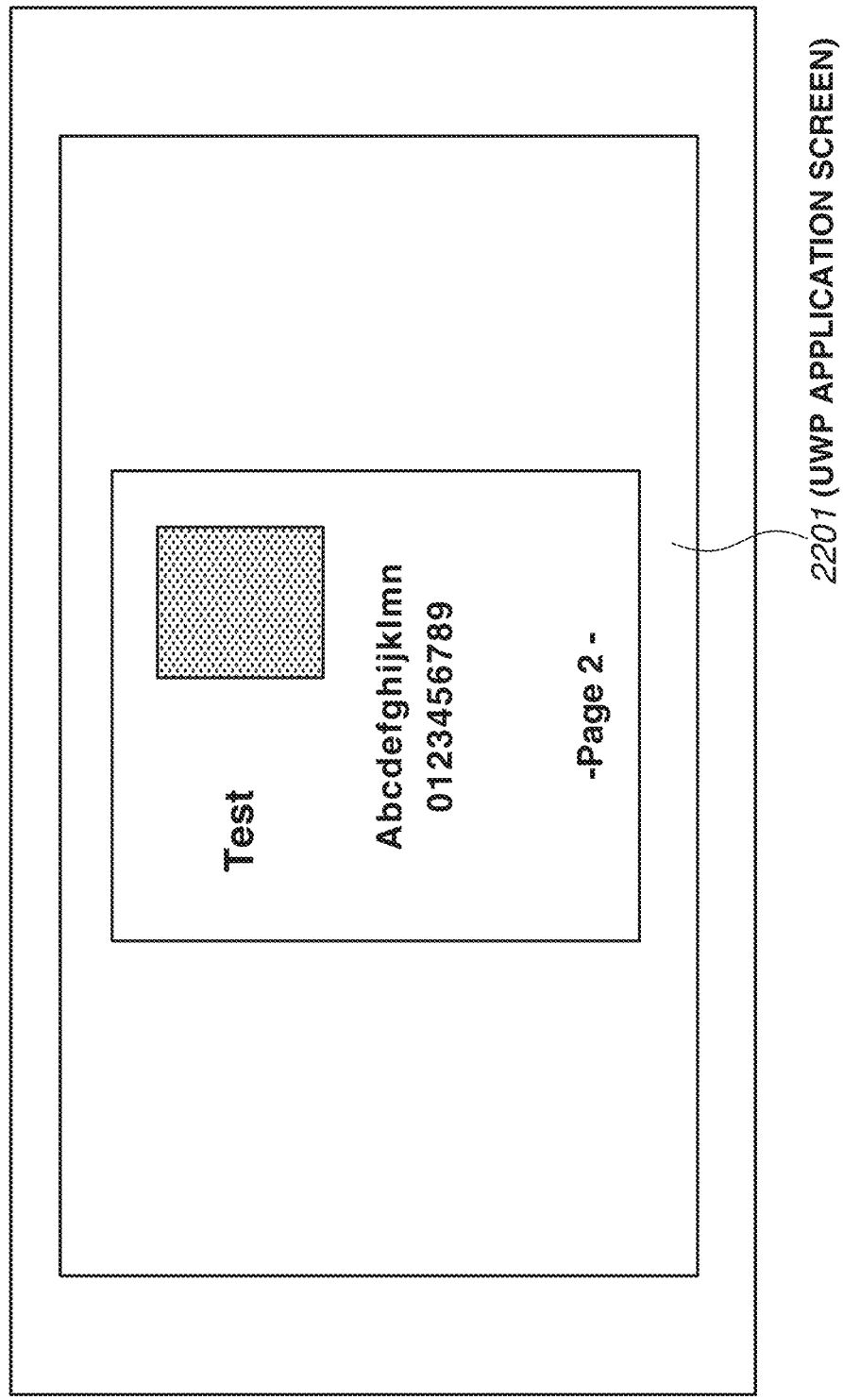

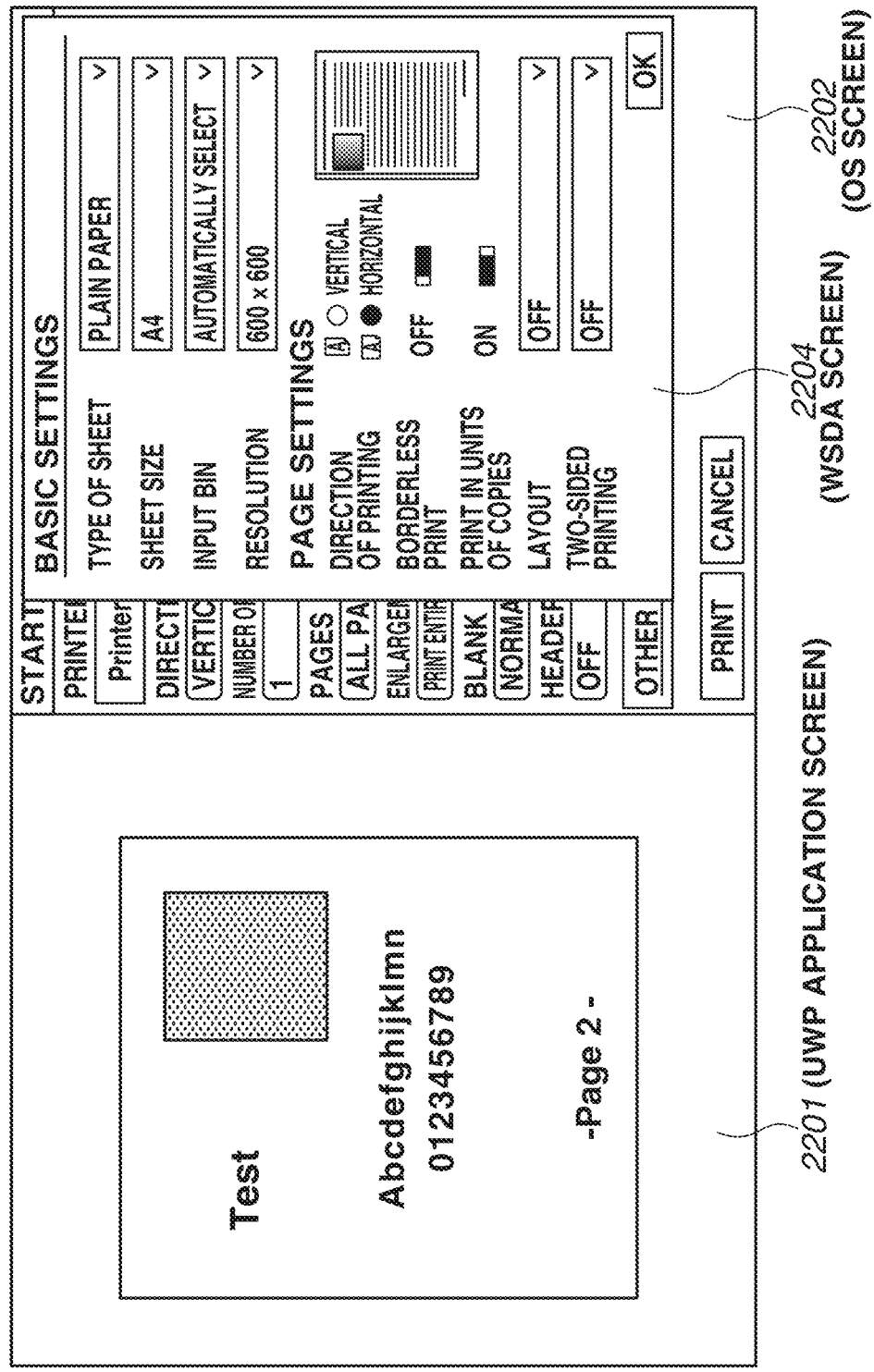

CONTROL METHOD FOR ACQUIRING DATA

BACKGROUND OF THE INVENTION

Field of the Invention

The present invention relates to a control method.

Description of the Related Art

The configuration described below is generally known. Using a printer driver installed on a host computer as software for controlling a printing apparatus, the printing apparatus connected to the host computer performs printing. An operating system (OS), which is basic software, is installed on the host computer, and the printer driver is configured according to the specifications prescribed by the OS and operates by being called by the OS. A vendor providing the printing apparatus provides a printer driver that matches the specifications of the OS, and thereby can provide a method for instructing the printer to perform printing, using the OS. In a case where a version earlier than Windows® 8 of Microsoft® is used as the OS, the printer driver is configured according to an architecture termed the "V3 printer driver". The V3 printer driver can provide the function of displaying a graphical user interface (hereinafter also referred to as a "user interface" or a "GUI") at the timing when a print request is made by a user, and urging the user to perform some operation. For example, if a print request is made, a prescribed event of a configuration module as a component of the V3 printer driver is called. Thus, the configuration module can display a user interface in the processing of the event.

In recent years, a new architecture termed the "V4 printer driver" appears in Windows®. In the V4 printer driver, security is emphasized, and therefore, the customizability of the printer driver itself decreases. For example, the above configuration module is provided by the OS, and the vendor can provide only a setting file and a script file for customizing the operation of the configuration module. To compensate for such a decrease in the customizability, the vendor providing the printing apparatus can provide an application dedicated to assisting the function of the printer driver. This application (app) is termed a "Windows Store Device App (WSDA)". In the publication of Japanese Patent Application Laid-Open No. 2017-33052, a vendor providing a printing apparatus provides a WSDA so that a print setting screen for performing printing can be customized through a particular application.

SUMMARY OF THE INVENTION

The V4 printer driver can be configured as a class driver for, as a single printer driver, supporting a plurality of printing apparatuses. In recent years, a standard class driver is provided. The standard class driver can be used by an OS in common for printing apparatuses provided by a plurality of vendors. Such a standard driver is included in the package of the OS and can be used by simply connecting any printing apparatus to a host computer. Thus, it is not necessary to separately install a printer driver suitable for a printing apparatus, which is convenient.

As described above, while the V4 printer driver improves in security and convenience, the customizability of the printer driver itself decreases, an example of which is as follows: the printer driver does not have the function of providing a GUI. Consequently, a WSDA is used to provide a GUI, such as a print setting screen, even in a case where a driver that does not include the function of providing a GUI, as in the V4 printer driver. A conventional WSDA, however, still has functional restrictions. In view of such a problem, the present invention is directed to providing an appropriate function according to a driver to be used.

To solve the above issue, according to an aspect of the present invention, a control method for an information processing apparatus which comprises a memory that stores a graphical user interface (GUI) application capable of providing a GUI in a case where a driver that does not have a function of providing a GUI is selected, the control method includes causing the GUI application to acquire drawing data generated by a drawing application, causing the GUI application to acquire at least either of data including information indicating a setting used when a predetermined process is performed based on the drawing data by a predetermined device, and data including information indicating a capability of the driver, causing the GUI application to determine whether first information is included in at least either of the data including the information indicating the setting and the data including the information indicating the capability of the driver, and causing the GUI application to provide a first display item, wherein according to whether the first information is included, whether the GUI application is to provide the first display item is changed.

Further features of the present invention will become apparent from the following description of embodiments with reference to the attached drawings.

BRIEF DESCRIPTION OF THE DRAWINGS

FIG. 3 is an example of a description of corresponding device information in metadata.

FIG. 4 is an example of a description of association information of an at-time-of-printing start application in the metadata.

FIG. 9 is an example of PrintCapabilities of a fax driver.

FIG. 10 is an example of PrintCapabilities of a model-based printer driver.

FIG. 11 is an example of PrintCapabilities of a common driver.

FIG. 12 is an example of PrintCapabilities of a standard driver.

FIG. 13 is an example of PrintTicket of the model-based printer driver.

FIG. 14 is an example of PrintTicket of the fax driver.

FIG. 15 is an example of an extension function supported by the at-time-of-printing start application.

FIG. 16 is an example of information stored in Local Storage.

FIGS. 22A, 22B, and 22C are schematic diagrams illustrating screens in a case where a print instruction is issued.

DESCRIPTION OF THE EMBODIMENTS

Figure 1:
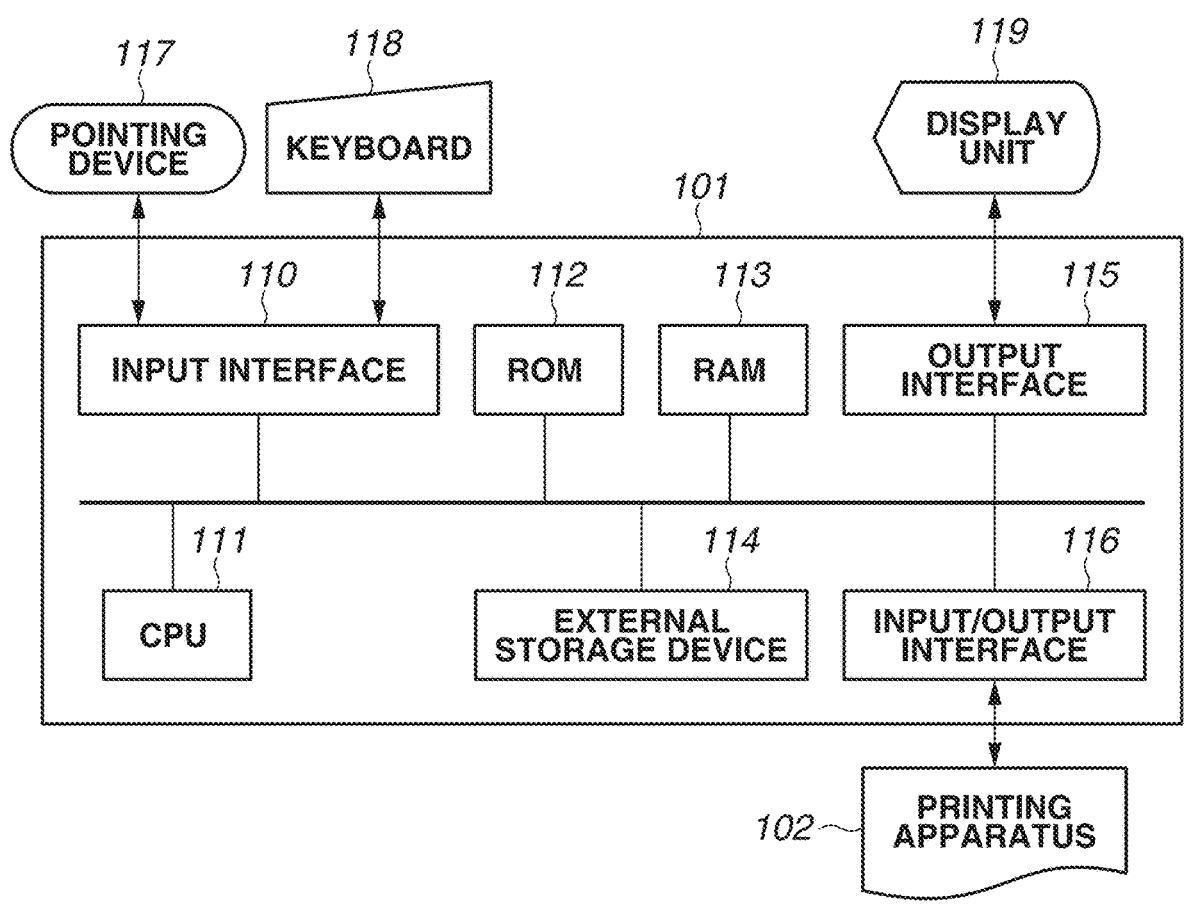
FIG. 1 is a block diagram illustrating a hardware configuration of a printing system.

In embodiments of the present invention, a description is given of an example for providing an appropriate function according to a driver, using a graphical user interface (hereinafter also referred to as "user interface" or "GUI") application. This GUI application starts and provides a GUI in a case where a driver that does not have the function of providing a GUI, as in the V4 printer driver, is used.

A conventional Windows Store Device App (WSDA) for extending the V4 printer driver can also provide a GUI, but has the following functional restrictions. Specifically, the conventional WSDA is optionally started according to a user instruction and therefore is incompatible with a use case where a user interface should always be displayed when printing is requested. Further, the conventional WSDA is an application configured to change print settings, and therefore cannot access drawing data (an image or text information based on which printing is formed on a sheet surface) generated by a drawing application having issued a print request. Thus, the conventional WSDA cannot display or edit the drawing data. Thus, in the V4 printer driver, it is difficult for the conventional WSDA to provide the function of displaying a user interface at the timing when a print request is made by a user, receiving a user operation, and reflecting the user operation on a printing process.

Further, according to information indicating the capability of a printer driver connected to the conventional WSDA, the conventional WSDA provides a user interface for designating the information. If the WSDA includes, in print settings, a function instruction regarding a function that is not included in the capability information of the printer driver, the function instruction is information unknown to the printer driver, and therefore does not effectively work. Further, as described above, since the conventional WSDA cannot access drawing data, the WSDA itself cannot receive a function instruction and edit drawing data, either. Accordingly, even if a vendor providing a printing apparatus provides the WSDA for a class driver provided together with an OS as described above, the vendor cannot independently extend the function of the class driver.

In the present invention, it is possible to provide an appropriate function according to a driver, using an application that is not subject to the above functional restrictions. Suitable embodiments of the present invention will be described in detail below with reference to the accompanying drawings. The following embodiments do not limit the present invention according to the appended claims, and not all the combinations of the features described in the embodiments are essential for a method for solving the problems in the present invention. The same component is designated by the same reference number, and is not repeatedly described.

<Hardware Configuration of Printing System>

FIG. 1 is a block diagram illustrating the hardware configuration of a printing system. In FIG. 1, a host computer 101 is an example of an information processing apparatus and includes an input interface 110, a central processing unit (CPU) 111, a read-only memory (ROM) 112, a random-access memory (RAM) 113, an external storage device 114, an output interface 115, and an input/output interface 116. Further, the input interface 110 is connected to input devices, such as a keyboard 118 and a pointing device 117. The output interface 115 is connected to a display device, such as a display unit 119.

The ROM 112 stores an initialization program. The external storage device 114 stores a group of application programs, an operating system (OS), a printer driver, and various other types of data. The RAM 113 is used as a work memory when various programs stored in the external storage device 114 are executed.

In the present embodiment, the functions of the host computer 101 described below and processing regarding flowcharts described below are achieved by the CPU 111 performing processing according to the procedure of a program stored in the ROM 112. A printing apparatus 102, which is a device, is connected to the host computer 101 via the input/output interface 116. In this case, the host computer 101 and the printing apparatus 102 are separately configured. Alternatively, the host computer 101 and the printing apparatus 102 may be configured as a single information processing apparatus.

<Block Configuration of Driver Printing System>

Figure 2:
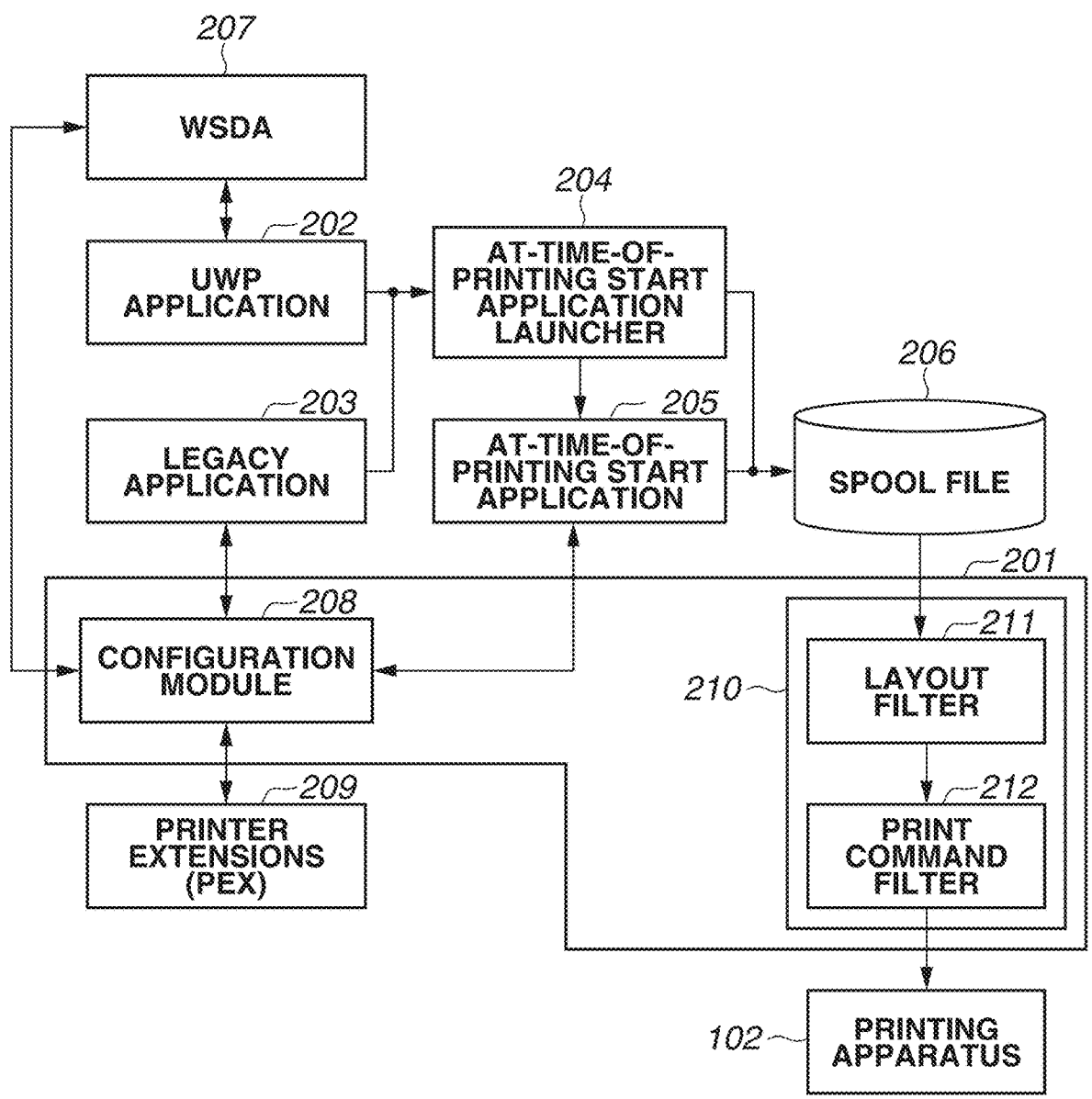
FIG. 2 is a diagram illustrating a block configuration of a driver printing system.

FIG. 2 is a diagram illustrating the block configuration of a driver printing system. In this case, a description is given on the premise of a printing system operating according to an architecture termed the "V4 printer driver", using the host computer 101 in which an OS of Windows® 8 or later of Microsoft® is provided as an OS.

Figure 22B:
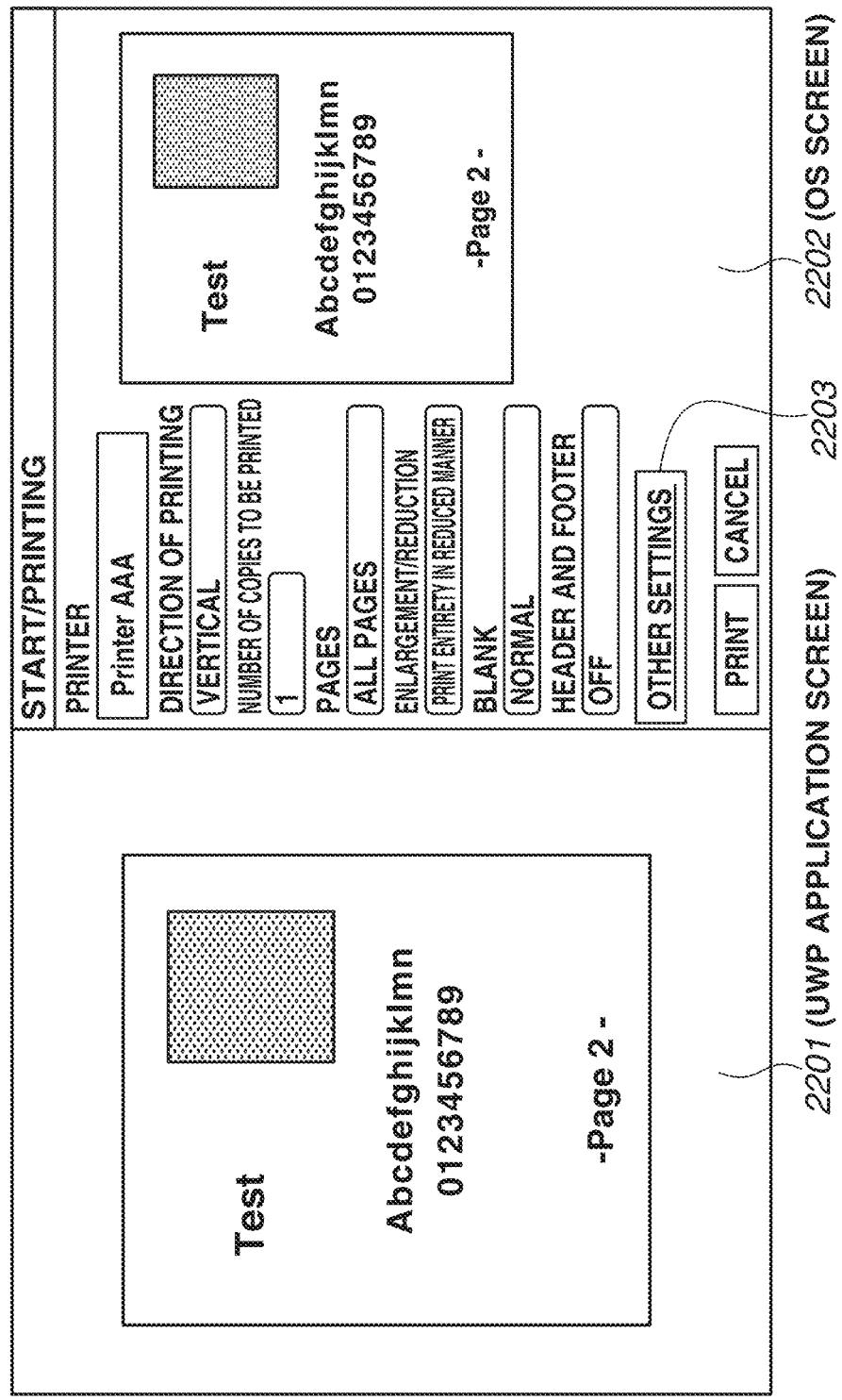

If a user gives an instruction to perform printing through a Universal Windows Platform (UWP) application 202, a predetermined screen is displayed by Modern Print Dialog (MPD) (not illustrated), which is a function of the OS. The UWP application 202 is a drawing application. The screen provided by the MPD has a print preview function for allowing the user to check a printing result on the screen, and the function of allowing the user to select basic print settings. FIGS. 22A, 22B, and 22C illustrate specific examples. In FIG. 22A, if an instruction to perform printing is given on a screen 2201 provided by the UWP application 202, which is a drawing application, a setting screen 2202 illustrated in FIG. 22B is displayed by the MPD of the OS. On the setting screen 2202, the user can select a driver to be used. Further, on the setting screen 2202, the user can also designate basic print settings.

Further, the MPD receives an instruction from the user and starts a WSDA 207, which allows the user to select detailed print settings. Specifically, if an "other settings" button 2203 is pressed on the setting screen 2202 in FIG. 22B, a detailed setting screen 2204 provided by the WSDA 207 and illustrated in FIG. 22C is displayed. On the detailed setting screen 2204, the user can designate more detailed print settings. The WSDA 207 is an application for extending the function of a printer driver 201, which is provided by a vendor providing the printing apparatus 102 (hereinafter, a "printer vendor"). An image that is displayed in the detailed setting screen 2204 provided by the WSDA 207 and looks like a document image is a sample image originally included in the WSDA 207. Thus, this image in the detailed setting screen 2204 provided by the WSDA 207 is not a preview image based on drawing data generated by the UWP application 202, but a sample image that does not change even if the drawing data changes. The WSDA 207 receives information indicating print settings from the MPD, changes setting information of the print settings according to a user operation, and returns the setting information to the MPD. In this case, the information indicating the print settings is described in an Extensible Markup Language (XML) format based on a form defined by the OS and is included in data termed "PrintTicket". The WSDA 207 can reference and change the PrintTicket, but cannot reference drawing data (an image or text information based on which printing is formed on a sheet surface). Further, the WSDA 207 is started only in a case where the user presses the "other settings" button 2203 on the setting screen 2202 provided by the MPD. Thus, the WSDA 207 is not always started when print settings are made.

The PrintTicket is generated by a configuration module 208 of a selected printer driver 201. The WSDA 207 calls the configuration module 208 to generate PrintTicket to which designation by the user is reflected. Further, the configuration module 208 also has the function of generating PrintCapabilities describing, in XML format based on the form defined by the OS, a function that can be set by the selected printer driver 201 and a selection item. The WSDA 207 or Printer Extensions (PEX) 209 provides a user interface based on the information described in the PrintCapabilities. Further, through the functions of the OS, an at-time-of-printing start application 205 can acquire the PrintCapabilities generated by the configuration module 208.

Although FIG. 2 illustrates the configuration module 208 as a function of the printer driver 201, the configuration module 208 is originally a component of the OS. The V4 printer driver itself, however, does not include a configuration module, and therefore uses the configuration module 208, which is a component of the OS, as a configuration module of the driver. The printer vendor can customize the operation of the configuration module 208 by Generic Printer Description (GPD) (not illustrated) included in the printer driver 201 or JavaScript (registered trademark) Constraint.

After the print settings illustrated in FIGS. 22A, 22B, and 22C are made, and if a "print" button is pressed on the setting screen 2202 provided by the MPD of the OS, a print request is made. If the user gives an instruction to perform printing on the MPD, the UWP application 202 receives a request from the MPD and generates print data necessary for printing. This print data is an "XML Paper Specification" (hereinafter, "XPS") document described in a form termed "XPS". The print data in the present embodiment includes the PrintTicket and drawing data generated by a drawing application.

The XPS document generated by the UWP application 202 is transferred to an at-time-of-printing start application launcher 204, which is a component of the OS. If it is determined that an at-time-of-printing start application 205 associated with the printer driver 201 is present and configured to start, the at-time-of-printing start application launcher 204 starts the at-time-of-printing start application 205. If a corresponding at-time-of-printing start application 205 is not present, the at-time-of-printing start application launcher 204 stores the XPS document as a spool file 206.

Similarly to the WSDA 207, an at-time-of-printing start application 205 is an application for extending the function of the printer driver 201, which is provided by the printer vendor. That is, the at-time-of-printing start application 205 is a GUI application capable of providing a GUI based on an instruction from the OS in a case where a driver that does not include the function of providing a GUI, as in the V4 driver, is selected. If a V3 driver, which has the function of providing a GUI, is selected, the OS does not start the at-time-of-printing start application launcher 204, and stores an XPS document generated by a drawing application as the spool file 206. That is, if a V3 driver is selected, the at-time-of-printing start application 205 does not start or provide a GUI.

Neither the WSDA 207 nor the at-time-of-printing start application 205 is provided as one of the components of the printer driver 201, and both the WSDA 207 and the at-time-of-printing start application 205 are independent applications. Further, the WSDA 207 and the at-time-of-printing start application 205 can be configured together as a single application. For convenience, however, to describe the difference from the conventional WSDA, the WSDA 207 and the at-time-of-printing start application 205 are described as separate applications.

Normally, the WSDA 207 and the at-time-of-printing start application 205 are acquired from an application distribution system (a server managed by Microsoft®) (not illustrated) via the Internet by the OS. Further, the printer vendor provides, in advance, metadata described below for a metadata server managed by Microsoft®, whereby an appropriate WSDA 207 and an appropriate at-time-of-printing start application 205 are automatically installed. Specifically, if the printing apparatus 102, which is a device, is connected to the input/output interface 116, then based on the metadata, a WSDA 207 and an at-time-of-printing start application 205 associated with the printing apparatus 102 are automatically installed on the printing apparatus 102.

The at-time-of-printing start application 205 can display a user interface for receiving an operation instruction from the user. Further, the at-time-of-printing start application 205 can receive an XPS document, which is print data, and edit PrintTicket and drawing data in the XPS document. If the at-time-of-printing start application 205 outputs the XPS document edited as necessary, the OS stores the output XPS document as the spool file 206. If the spool file 206 is stored, the processing is transferred to a filter pipeline manager 210. The filter pipeline manager 210 has a mechanism for performing printing through a plurality of filters and controls the number and the order of filters using a configuration file (not illustrated). The group of filters in the present embodiment includes a layout filter 211, which is a layout processing unit, and a print command filter 212, which is a print command conversion unit.

To the layout filter 211, the XPS document stored as the XPS spool file 206 is input. The layout filter 211 has the function of performing a layout process for pages based on print setting information, and outputting the laid out XPS document. The layout process includes, for example, layout printing for printing a plurality of pages on a single sheet surface, and poster printing for printing a single page on a plurality of sheet surfaces.

To the print command filter 212, the output of the layout filter 211 is input. The print command filter 212 has the function of, according to the print setting information, converting the XPS document into a print command that can be interpreted by the printing apparatus 102, and outputting the print command. In a case where the print command filter 212 converts the input XPS document into image data, the print command filter 212 is generally termed a "render filter". The render filter is often used in a printer driver for an inexpensive raster printer typified by an inkjet printer. In a case where the print command filter 212 operates as the render filter, the print command filter 212 converts the input XPS document into image data once. Then, through image processing including color space conversion and binarization, the image data is converted into a print command that can be interpreted by a raster printer.

In a highly functional printer typified by a page printer, if the types of print commands that can be interpreted by the printing apparatus 102 include XPS, the print command filter 212 edits the input XPS document and outputs the XPS document. If the print command filter 212 does not need to process the input XPS document, the print command filter 212 may output the input XPS document as it is, or the print command filter 212 may not be included in the printer driver 201. This is the basic process of printing through the UWP application 202.

A legacy application 203, which is a drawing application for a Win32 application, can start the PEX 209 to make print settings. The PEX 209 is started via the configuration module 208 and can provide a user interface allowing the user to designate print settings. The PEX 209 may be provided together with the printer driver 201 as components in a driver package, or may be distributed separately from the printer driver 201. Similarly to the WSDA 207, the PEX 209 can reference and change PrintTicket, but cannot reference drawing data (an image or text information based on which printing is formed on a sheet surface). Further, the PEX 209 is started only in a case where the user gives an instruction to start the PEX 209 on the legacy application 203. Thus, the PEX 209 is not always started when printing is performed. If an instruction to perform printing is given on the legacy application 203, the legacy application 203 generates an XPS document as print data. The subsequent flow is equivalent to that when printing is performed through the UWP application 202, and therefore is not described here.

The printer driver 201 in this configuration may also function as a fax driver. In this case, the printer driver 201 generates not a print command that can be interpreted by the printing apparatus 102, but a fax command for requesting the printing apparatus 102 to transmit fax. Also in the following description, for convenience, even the fax driver will occasionally be described as the printer driver 201, and even a fax instruction will occasionally be described as a print instruction.

<Metadata Associating Printing Apparatus with at-Time-of-Printing Start Application>

FIG. 3 is an example of a description indicating corresponding device information in metadata 301, which associates the printing apparatus 102 with the at-time-of-printing start application 205. In the metadata 301, a "HardwareIDList" tag 302 is described, which indicates a list of printing apparatuses 102 that use the metadata 301. An item 303 indicates that a printing apparatus 102 having the hardware identification (ID) "MFP1_abcd" uses the metadata 301. Similarly, an item 304 indicates that a printing apparatus 102 having the hardware ID "MFP2_ijkl" uses the metadata 301. As described above, for a single piece of metadata, a plurality of devices that use the single piece of metadata can be listed. For the metadata 301, two printing apparatuses are designated as devices. Alternatively, a single printing apparatus or three or more printing apparatuses may be designated. A "hardware ID" is identification information returned from a printing apparatus 102 and for uniquely identifying the printing apparatus 102.

FIG. 4 is an example of a description indicating the at-time-of-printing start application 205, which is to be associated, in the metadata 301 that associates the printing apparatus 102 (i.e., a device) with the at-time-of-printing start application 205 (i.e., a GUI application). In the metadata 301 in FIG. 4, a "DeviceCompanionApplications" tag 401 is described, which indicates an at-time-of-printing start application 205 associated by the metadata 301. An item 402 indicates that an at-time-of-printing start application 205 having the name "1234abcd.MFPUtility" and provided by a printer vendor "12345678-abcd-efgh-ijkl-123456789012" is associated with the printing apparatuses 102 listed in the "HardwareIDList" tag 302.

If the printing apparatus 102 is connected to the host computer 101, the OS searches for metadata registered in a predetermined server (a metadata server managed by Microsoft®). Then, if the OS finds metadata in which a hardware ID returned from the connected printing apparatus 102 is described in the HardwareIDList, the OS saves the metadata in the external storage device 114 of the printing apparatus 102. Further, the OS acquires, from an application distribution system (not illustrated), an at-time-of-printing start application 205 described in the "DeviceCompanionApplication" tag 401 of the saved metadata. Then, the OS installs the at-time-of-printing start application 205 on the external storage device 114 and associates the at-time-of-printing start application 205 with the printing apparatus 102. Consequently, when a print request is made to the printing apparatus 102 via the printer driver 201, the at-time-of-printing start application 205 associated with the printing apparatus 102 is started.

This metadata is provided by the printer vendor. The printer vendor provides the metadata in advance for a metadata server managed by Microsoft® and thereby can perform control so that when a printer driver 201 is installed on a user environment, an optimal at-time-of-printing start application 205 for a connected device is automatically installed on the connected device. According to an instruction from the user, a plurality of printer drivers 201 can also be installed on a single device.

<Print Environment Configured by Metadata 301>

Figure 5:
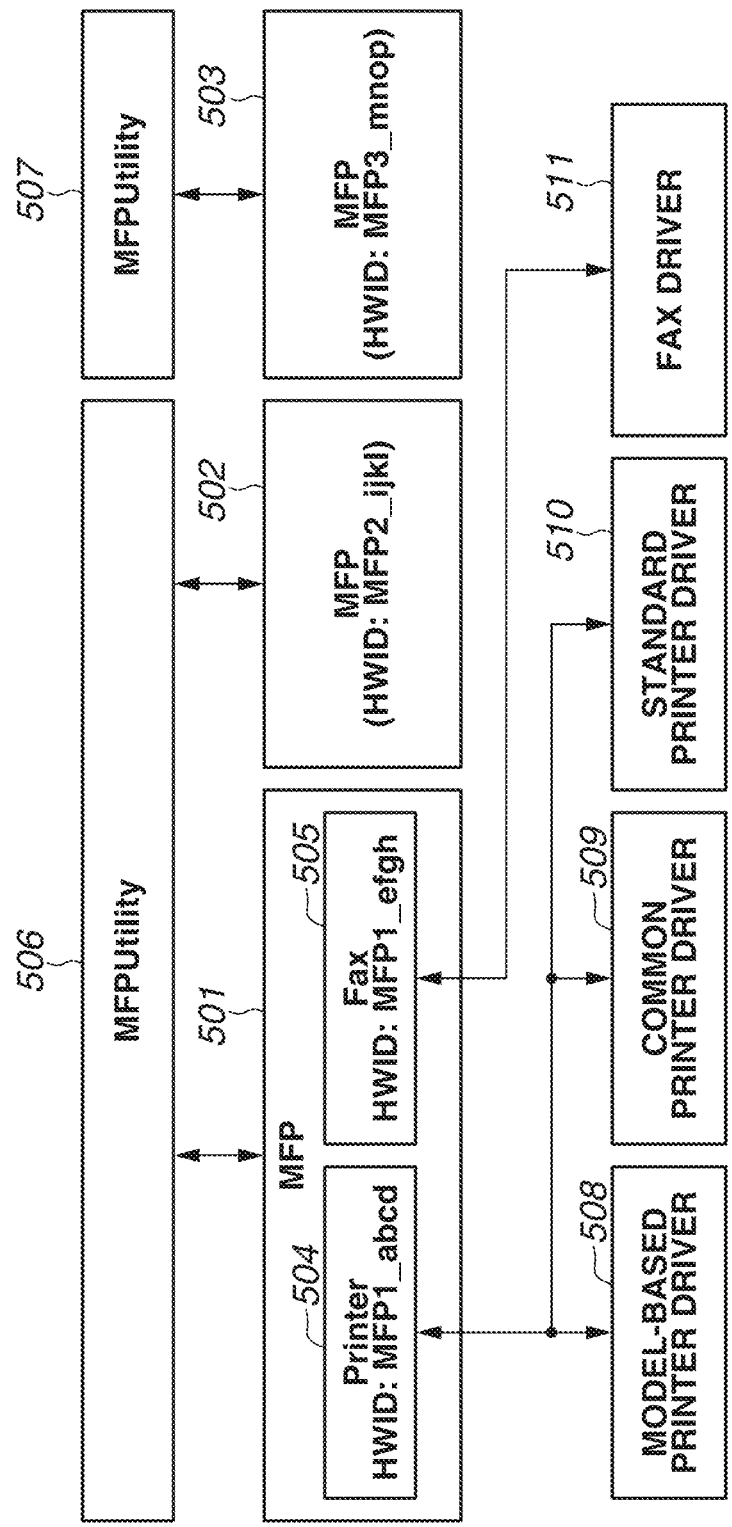
FIG. 5 is a block diagram illustrating a print environment configured by the printing system.

FIG. 5 is a diagram illustrating an example of a print environment configured by the metadata 301. A multifunction peripheral (MFP) 501, which is the printing apparatus 102, includes a printer 504 (print function unit) and a fax 505 (fax function unit) in a single apparatus. The fax 505 transmits a received print request as facsimile. The printer 504 has the hardware ID "MFP1_abcd". The fax 505 has the hardware ID "MFP1_efgh". The hardware ID of the fax 505 can also be the same hardware ID as that of the printer 504 so that processing between the printer 504 and the fax 505 can be switched according to a command.

If the MFP 501 is connected to the host computer 101, the OS acquires the metadata 301 in which the hardware ID "MFP1_abcd" is described in the "HardwareIDList" tag 302.

Further, the OS acquires an at-time-of-printing start application 205, which corresponds to MFPUtility 506, described in the metadata 301. Then, the OS associates the at-time-of-printing start application 205 with the MFP 501. Although the fax 505 has a hardware ID different from that of the printer 504, the OS determines these two processing units as the same device (a composite device) based on information acquired from the printing apparatus 102. Thus, the fax 505 is also associated with the same metadata 301 and the same MFPUtility 506 as the printer 504. Alternatively, the hardware ID "MFP1_efgh" of the fax 505 can be described in the "HardwareIDList" tag 302 of the metadata 301.

There can be a plurality of types of printer drivers 201 to be installed for the printer 504 of the MFP 501. That is, there can be a plurality of drivers as drivers compatible with the MFP 501, which is a single device. A model-based printer driver 508 is a printer driver provided by the printer vendor and dedicated to the printer 504 of the MFP 501. A common printer driver 509 is a common printer driver provided by the printer vendor and capable of processing a plurality of types of printing apparatuses 102 of the printer vendor. Then, a standard printer driver 510 is a class driver that can be used in common for printing apparatuses provided by a plurality of vendors, and is a printer driver provided together with the OS as one of functions in the package of the OS. The standard printer driver 510 is a printer driver capable of processing a wide range of printing apparatuses 102, using a standardized printing method.

As described above, there are a plurality of printer drivers 201 that can be used for a certain printing apparatus 102. A printer driver 201 to be used differs according to the Internet connection state, the type of the OS, or the use environment. Normally, the OS references version information of a printer driver, automatically selects and installs the most functional and newest printer driver 201 among the printer drivers 201 that can be used. Each printer driver 201 includes information termed a "Hardware ID" and a "Compatible ID" for identifying an apparatus. If the printing apparatus 102 is connected to the host computer 101, the OS acquires the above ID information from the printing apparatus 102, searches for a printer driver 201 having corresponding IDs, and installs the printer driver 201 on the printing apparatus 102.

For the fax 505 of the MFP 501, a fax driver 511 having the hardware ID "MFP1_efgh" is installed. Further, if an MFP 502 having the hardware ID "MFP2_ijkl" is connected to the host computer 101, the MFP 502 is associated with the MFPUtility 506. This is because, as indicated by the item 304 in FIG. 3, the HardwareIDList as a target in the metadata 301 includes MFP2_ijkl. An MFP 503 having the hardware ID "MFP3_mnop" is associated with MFPUtility 507, which is different from the MFPUtility 506, according to the description of metadata (not illustrated) different from the metadata 301.

As described above, the printer vendor providing printing apparatuses 102 provides metadata and thereby can control which of at-time-of-printing start applications 205 is to be provided for each printing apparatus 102. For example, the printer vendor can provide a single at-time-of-printing start application 205 in common for the plurality of printing apparatuses 102, or can provide different at-time-of-printing start applications 205 for the plurality of printing apparatuses 102. It is, however, not possible to separately provide at-time-of-printing start applications 205 according to the types of printer drivers 201 associated with the printing apparatuses 102. In FIG. 5, there are four types of drivers, namely the drivers 508 to 511, as printer drivers 201 to be used by the MFP 501, but the printer drivers 201 are always associated with a single type of at-time-of-printing start application 205.

The WSDA 207 is also associated with the printing apparatus 102 and the printer driver 201 by a mechanism equivalent to that of the at-time-of-printing start application 205. Thus, restrictions regarding the association are equivalent to those of the at-time-of-printing start application 205.

<Setup Process for at-Time-of-Printing Start Application>

Figure 6:
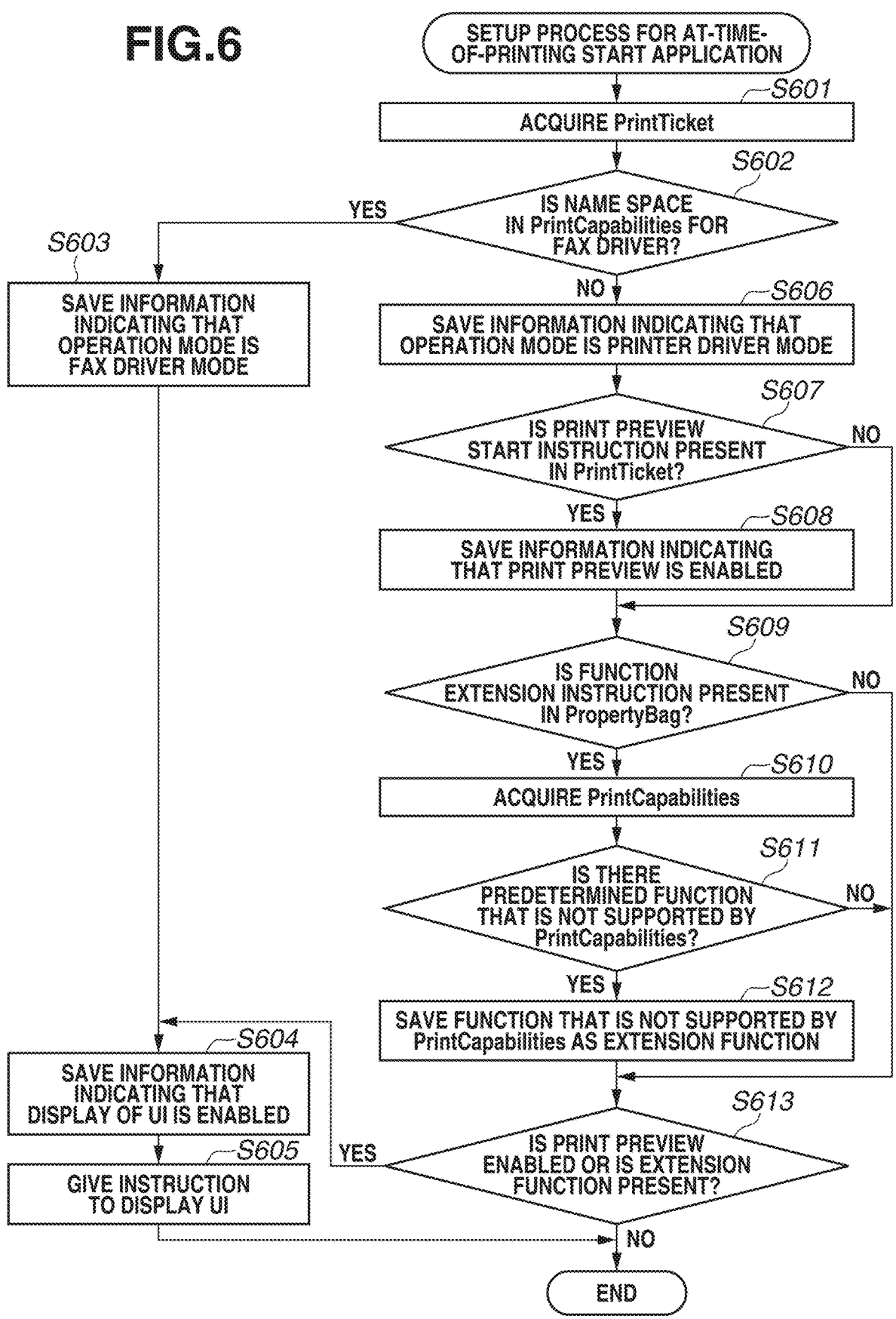
FIG. 6 is a flowchart of a setup process for the at-time-of-printing start application.

FIG. 6 is a diagram illustrating a main processing procedure in a setup process for the at-time-of-printing start application 205 in the printing system. This processing flow is an example of the processing of the at-time-of-printing start application 205 in the configuration of the MFPUtility 506 in FIG. 5, for example. In the following description, the at-time-of-printing start application 205 may perform each process, but actually, each function is achieved by the CPU 111 executing a corresponding program. All the processing is not necessarily sequentially executed in a single process, and there can also be a case where the processing is transferred to the OS once and called by the OS again. The processing procedure is merely a procedure simply illustrating the main processing of the at-time-of-printing start application 205 for convenience.

In a case where receiving an XPS document from a drawing application as a print request source, the at-time-of-printing start application launcher 204 calls an initialization process for an at-time-of-printing start application 205 associated with the printing apparatus 102. After the print settings described with reference to FIGS. 22A, 22B, and 22C are made, and if the "print" button is pressed on the setting screen 2202 provided by the OS, a print request is made, and an XPS document is output from a drawing application.

Figure 8:
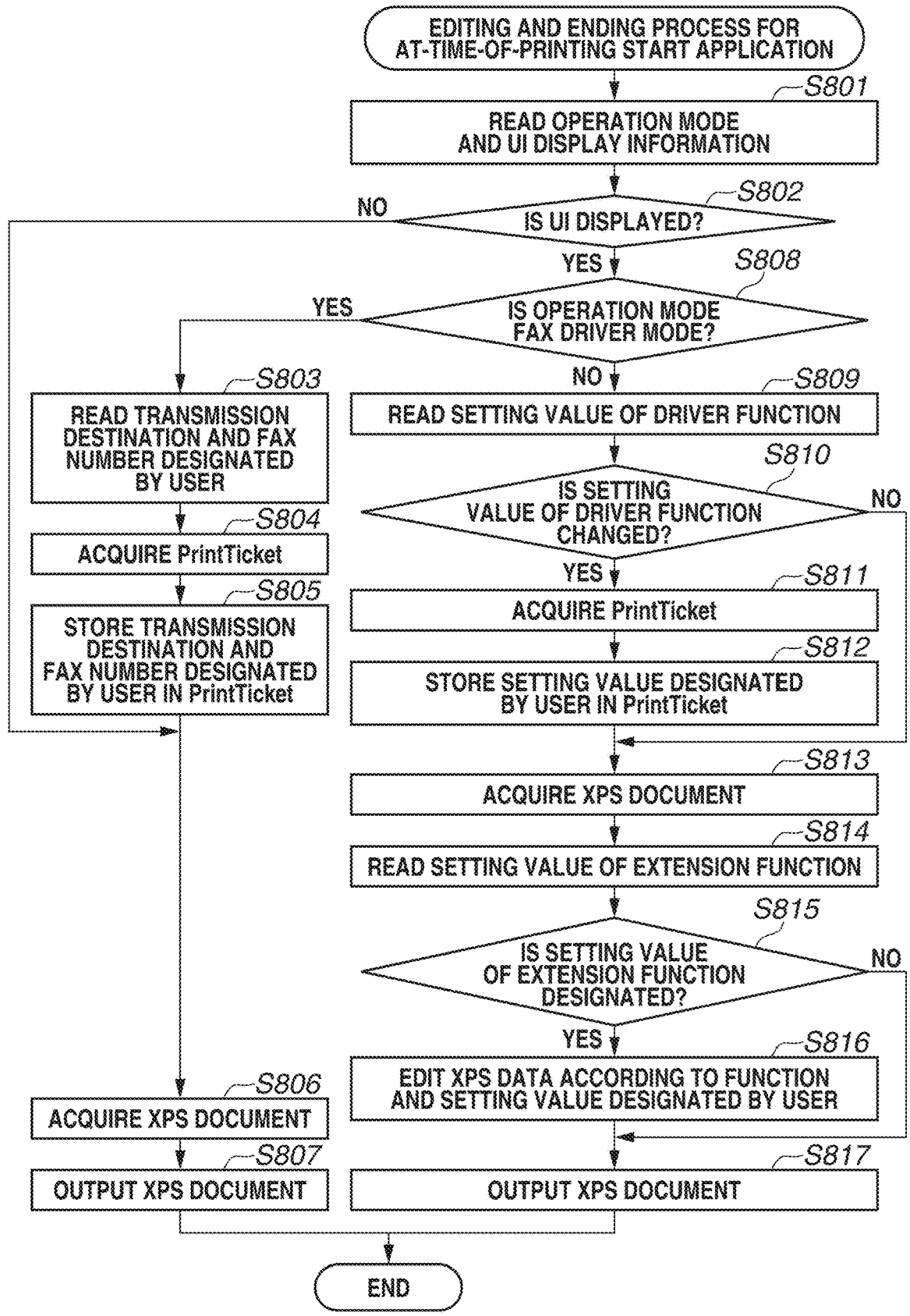
FIG. 8 is a flowchart of an editing and ending process for the at-time-of-printing start application.

In the initialization process, the at-time-of-printing start application 205 registers the setup process illustrated in FIG. 6 and an editing and ending process illustrated in FIG. 8 as an event handler prescribed by the OS. In a case where the at-time-of-printing start application 205 ends the initialization process, the OS executes the setup process for the at-time-of-printing start application 205 registered as the prescribed event handler. FIG. 6 illustrates this setup process.

First, in step S601, the at-time-of-printing start application 205 acquires PrintTicket stored in the XPS document. As described with reference to FIG. 2, the PrintTicket is data including information indicating print settings and is generated by the configuration module 208 based on print settings designated by the user. The PrintTicket can be acquired from the XPS document by calling a predetermined application programming interface (API) of the OS.

Next, in step S602, the at-time-of-printing start application 205 acquires PrintCapabilities, which is data including information indicating the capability of the printer driver 201. Then, the at-time-of-printing start application 205 checks a name space in the PrintCapabilities to determine the type of the printer driver 201 having received the print request from the application. The details of the name space in the PrintCapabilities and the determination method for determining the name space will be described below.

Normally, the PrintTicket also stores name space information equivalent to that in the PrintCapabilities. Thus, the determination in step S602 may be made using the PrintTicket. Since it takes time to acquire the PrintCapabilities, the processing time can be shortened using the PrintTicket depending on the configuration. Further, the printer driver 201 may store information for the determination in DriverPropertyBag (not illustrated). The at-time-of-printing start application 205 may be configured to acquire the information stored in the DriverPropertyBag and use the information for the determination.

As a result of the determination in step S602, in a case where the printer driver 201 having received the print request from the application is the fax driver (YES in step S602), then in step S603, the at-time-of-printing start application 205 saves information indicating that the operation mode is a fax driver mode. In the process of step S603 and processes described below, the at-time-of-printing start application 205 holds information using, as an example, Local Storage provided by the OS. The overall configuration of information stored in the Local Storage will be described below. Similarly, in step S604, the at-time-of-printing start application 205 saves, in the Local Storage, information indicating that the display of a user interface (UI) is enabled.

Figure 7:
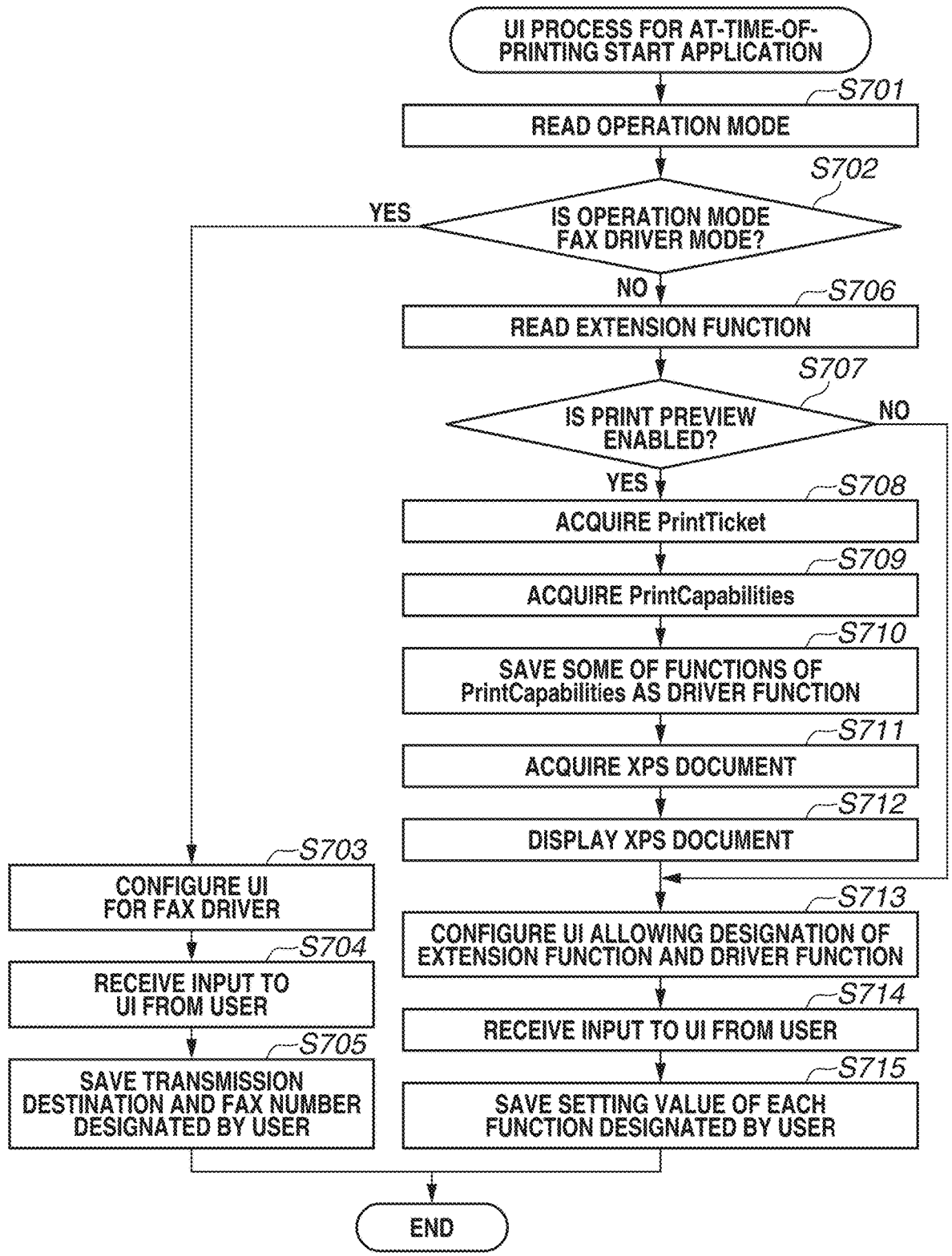
FIG. 7 is a flowchart of a user interface (UI) process for the at-time-of-printing start application.

Then, in step S605, the at-time-of-printing start application 205 calls the prescribed API provided by the OS and gives an instruction to display a user interface in the current execution of the at-time-of-printing start application 205. This API is executed, whereby a UI process for the at-time-of-printing start application 205 illustrated in FIG. 7 is called, and the at-time-of-printing start application 205 displays a user interface. This is the setup process by the at-time-of-printing start application 205 in the fax driver mode.

As a result of the determination in step S602, in a case where the printer driver 201 having received the print request from the application is not the fax driver (NO in step S602), then in step S606, the at-time-of-printing start application 205 saves information indicating that the operation mode is a printer driver mode.

Next, in step S607, the at-time-of-printing start application 205 references the PrintTicket and checks whether a print preview start instruction is present. The specific checking method for checking the PrintTicket will be described below with reference to FIG. 13. Alternatively, a print preview start instruction may be achieved by a method using other than the PrintTicket so long as the method can designate the print preview start instruction through the WSDA 207 and the PEX 209 and reference the print preview start instruction through the at-time-of-printing start application 205. For example, the configuration may be such that UserPropertyBag or QueuePropertyBag provided as the storage location of setting information of the printer driver 201 by the OS is used. A "print preview" refers to displaying, on the display unit 119, an image of a printing result to be generated on a sheet surface, based on print settings and print data generated by an application. That is, the fact that "a print preview start instruction is present in the PrintTicket" indicates that the user gives an instruction to display a print preview screen. By viewing the print preview screen, the user can check whether a desired printing result is to be obtained before printing is performed. Then, the user can give an instruction to correct the print settings, delete any page, or stop the printing process, as necessary.

In a case where it is determined in step S607 that a print preview start instruction is not present (NO in step S607), the processing proceeds to step S609. In a case where it is determined in step S607 that a print preview start instruction is present (YES in step S607), then in step S608, the at-time-of-printing start application 205 saves information indicating that the print preview is enabled.

Next, in step S609, the at-time-of-printing start application 205 checks whether a function extension instruction is present in PropertyBag. As described above, the "PropertyBag" refers to UserPropertyBag or QueuePropertyBag. This function extension is used by the printer vendor to extend a function that can be designated when printing is performed, for example, in a case where a printer driver only has basic functions as in the standard printer driver 510. In a case where PrintTicket including a description for giving an instruction to extend a function is transferred to the standard printer driver 510, this description is information unknown to the standard printer driver 510 and therefore is deleted as an improper description. In such a case, a function extension instruction is stored in the PropertyBag, whereby the function extension instruction is maintained without being deleted. Meanwhile, PrintTicket is information included in an XPS document, which is print data, and held with respect to each piece of print data. Thus, the PrintTicket has the advantage of, even in a case where a plurality of print requests are successively made, being able to accurately switch the enabled and disabled states of the print preview or the function extension with respect to each print request. The at-time-of-printing start application 205 may be configured to skip the process of step S609, and if a function can be extended, always enable the function extension.

In a case where it is determined in step S609 that a function extension instruction is not present in the PropertyBag (NO in step S609), the processing proceeds to step S613. In a case where it is determined in step S609 that a function extension instruction is present in the PropertyBag (YES in step S609), then in step S610, the at-time-of-printing start application 205 acquires the PrintCapabilities. In a case where the PrintCapabilities is already acquired in step S602, the process of step S610 is skipped.

Next, in step S611, the at-time-of-printing start application 205 determines whether there is a predetermined function that is not supported by the PrintCapabilities. The "predetermined function" refers to a function that can be edited by the at-time-of-printing start application 205 and can be provided as an extension function by the at-time-of-printing start application 205. That is, the at-time-of-printing start application 205 determines whether there is a function that is not described in the PrintCapabilities, and can be provided by the at-time-of-printing start application 205. Consequently, the at-time-of-printing start application 205 determines whether there is a function that is not supported by the printer driver 201, and can be provided by the at-time-of-printing start application 205. This determination process will be described in detail below with reference to FIG. 15.

In a case where it is determined in step S611 that there is not a corresponding function (NO in step S611), the processing proceeds to step S613. In a case where it is determined in step S611 that there is a corresponding function (YES in step S611), then in step S612, the at-time-of-printing start application 205 saves the corresponding function as an extension function in the Local Storage.

Next, in step S613, the at-time-of-printing start application 205 determines whether the print preview is enabled or an extension function to be provided is present. In a case where the at-time-of-printing start application 205 determines that the print preview is enabled or an extension function to be provided is present (YES in step S613), the processing proceeds to step S604. In step S604, the at-time-of-printing start application 205 gives an instruction to display a user interface. In a case where the at-time-of-printing start application 205 determines that the print preview is not enabled or an extension function to be provided is not present (NO in step S613), the at-time-of-printing start application 205 ends the setup process.

As described above, in the setup process for the at-time-of-printing start application 205, it is determined whether it is necessary to start a user interface. In a case where it is necessary, an instruction to start the user interface is given, and information necessary for subsequent processing is stored.

<Examples of Configurations of PrintTicket and PrintCapabilities and Related Process>

FIGS. 9 to 12 are examples of PrintCapabilities of the printer drivers and the fax driver having different configurations. The PrintCapabilities of these drivers mainly have portions necessary for the description and are partially omitted.

FIG. 9 is examples of PrintCapabilities of the fax driver 511. At the beginning of the PrintCapabilities, there is a "psf:PrintCapabilities" element. As the attributes of the "psf:PrintCapabilities" element, name spaces used in the PrintCapabilities are defined. Normally, in addition to name spaces indicating the definitions of OS standard termed "PrintSchema", name spaces independently defined by the printer vendor providing this printer driver 201 are listed here. The PrintCapabilities illustrated in FIG. 9 include a name space 901, which is independently defined by the printer vendor.

On the other hand, FIG. 10 is an example of PrintCapabilities of the model-based printer driver 508. PrintCapabilities 1000 illustrated in FIG. 10 include a name space 1001, which is independently defined by the printer vendor. Further, FIG. 11 illustrates an example of PrintCapabilities of the common driver 509. FIG. 12 illustrates an example of PrintCapabilities of the standard printer driver 510.

A name space is used to uniquely determine a function that can be selected, a selection item, and the definition of the function or the selection item. Even if printer drivers 201 are provided by the same printer vendor, but if the printer drivers 201 are greatly different in a set of functions from each other as in printer functions and fax functions, different values are generally set. Using this, in step S602, it may be determined whether a name space includes the Uniform Resource Locator (URL) "http://www.mfpvendor.com/ns/printschema/fax/v100" as illustrated in the name space 901 in FIG. 9.

FIG. 13 is an example of PrintTicket generated based on the PrintCapabilities 1000 of the model-based printer driver 508 illustrated in FIG. 10. As illustrated in FIG. 13, PrintTicket stores the setting values of functions defined in the PrintCapabilities 1000. For example, Feature "psk:PageMediaType" indicates a sheet type for use in printing. In the PrintTicket in FIG. 13, "psk:Plain", i.e., plain paper, is designated. In the determination process for determining whether a print preview start instruction is present in step S607, it is determined whether the designated value of Feature "ns0000:JobPreview" is "ns0000:ON".

Next, with reference to the PrintCapabilities in FIGS. 10 to 12 and FIG. 15, the determination process in step S611 is described in detail. FIG. 15 illustrates a list of predetermined functions that can be provided as extension functions by the at-time-of-printing start application 205, and selection items of the predetermined functions. In this case, the at-time-of-printing start application 205 has a page layout function for printing a plurality of pages by laying out the plurality of pages on a single page, and a stamp function for superimposing a designated stamp on a printing result.

In the determination process in step S611, the at-time-of-printing start application 205 analyzes the PrintCapabilities and checks whether there is a function indicated by a "function name" in FIG. 15. In a case where the printing target is the PrintCapabilities 1000 of the model-based printer driver 508, Feature "JobNUpAllDocumentsContiguously" and Feature "PageStamp" are present. Thus, the determination result is NO in step S611.

In a case where the printing target is PrintCapabilities 1100 of the common printer driver 509, the Feature "JobNUpAllDocumentsContiguously" is present, but the Feature "PageStamp" is not present. Thus, the determination result is YES in step S611. In this case, the at-time-of-printing start application 205 provides PageStamp, i.e., the stamp function, as an extension function. In a case where the printing target is PrintCapabilities 1200 of the standard printer driver 510, neither the Feature "JobNUpAllDocumentsContigu-
ously" nor the Feature "PageStamp" is present. Thus, the determination result is YES in step S611. At this time, the at-time-of-printing start application 205 provides JobNUpAllDocumentsContiguously and PageStamp, i.e., the layout function and the stamp function, as extension functions.

<Processing of WSDA and Example of Configuration of User Interface>

Figure 17:
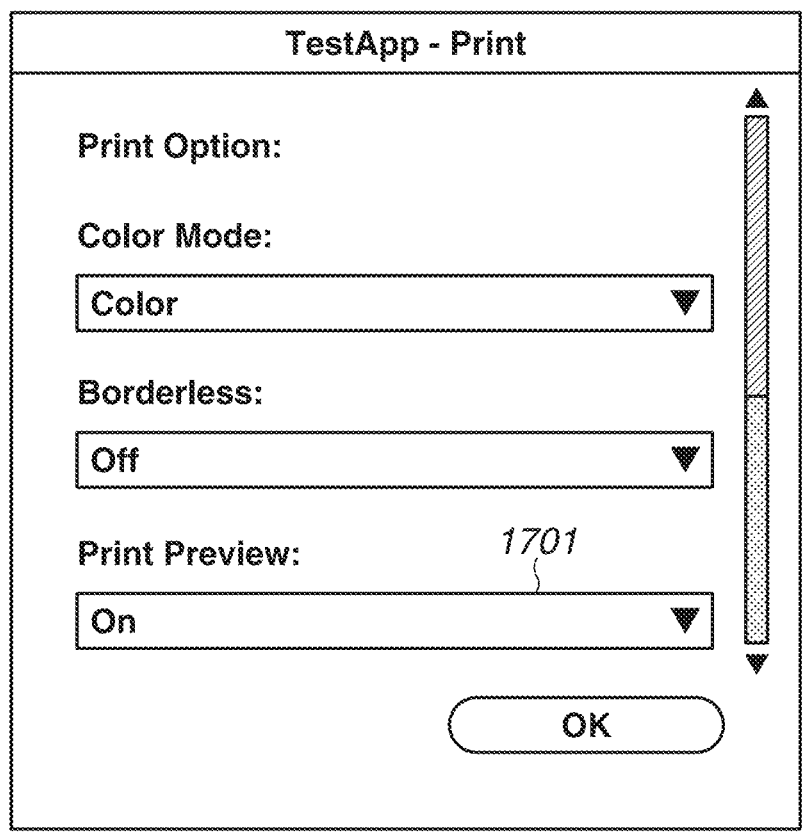
FIG. 17 is a schematic diagram of a user interface of a Windows Store Device App (WSDA) when the model-based printer driver is connected.

FIG. 17 is a diagram illustrating an example of a user interface provided by the WSDA 207 in a case where the user selects the model-based printer driver 508. A screen in FIG. 17 is an example of a setting screen provided by the WSDA 207 and is a screen provided before a print request is made by a drawing application. As indicated by an item 1002, the model-based printer driver 508 supports Feature "JobPreview", which indicates the print preview function. The WSDA 207 configures a user interface based on PrintCapabilities acquired from the printer driver 201, and therefore, based on the item 1002, displays a control item 1701 for switching the enabled and disabled states of the print preview. According to the designation by the user, the WSDA 207 stores the on or off state of the Feature "JobPreview" in PrintTicket. In the process of step S607, the at-time-of-printing start application 205 references this information and determines whether a print preview start instruction is present.

Figure 18:
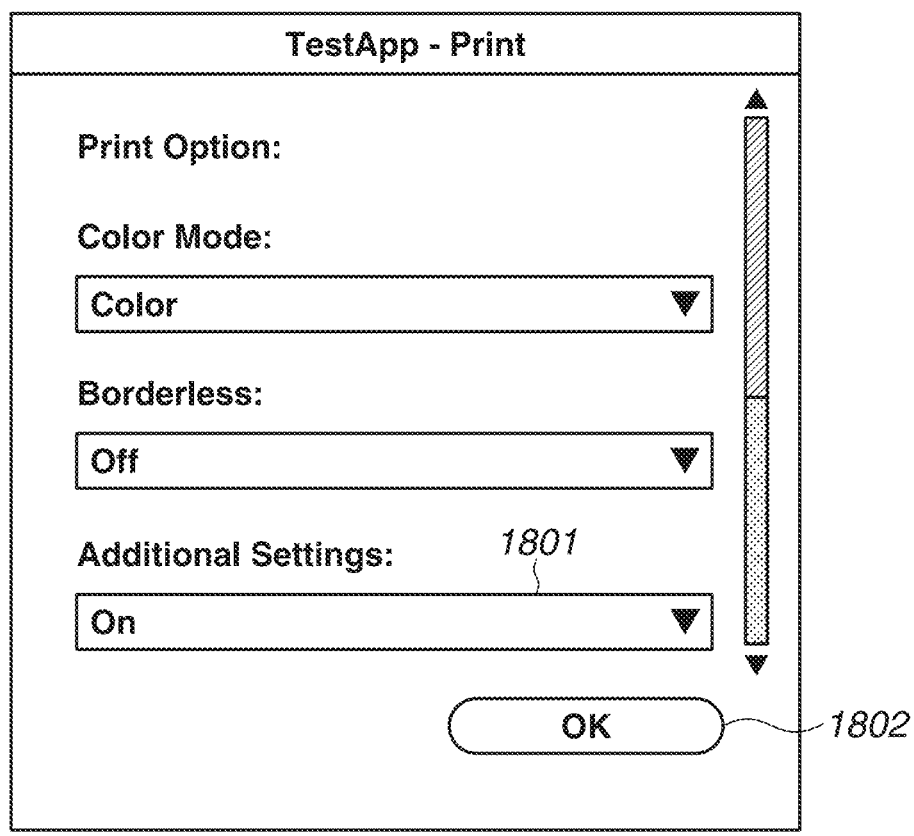
FIG. 18 is a schematic diagram of a user interface of the WSDA when the standard printer driver is connected.

FIG. 18 is a diagram illustrating an example of a user interface provided by the WSDA 207 when the standard printer driver 510 is selected as a print destination. A screen in FIG. 18 is also an example of a setting screen provided by the WSDA 207 and is a screen provided before a print request is made by a drawing application. The standard printer driver 510 does not support the Feature "JobPreview". In such a case, the WSDA 207 displays a control item 1801 for selecting whether an extension function is to be enabled. At the timing when the user presses an OK button 1802, the WSDA 207 stores in PropertyBag a value designated on the control item 1801. The WSDA 207 may be configured to give an instruction to start the print preview in addition to the extension function. In this case, the extension function and the print preview may be able to be designated using different controls, or simultaneously designated using a single control.

The PEX 209 can also provide a method for controlling the start of the at-time-of-printing start application 205 by processing equivalent to the above processing of the WSDA 207.

<UI Process for at-Time-of-Printing Start Application>

If an instruction to display a UI is given in step S605, and after the setup process for the at-time-of-printing start application 205 ends, the OS calls a UI process for the at-time-of-printing start application 205. FIG. 7 is a diagram illustrating a main processing procedure in the UI process by the at-time-of-printing start application 205 in the printing system. This processing procedure is an example of the processing of the at-time-of-printing start application 205 in the configuration of the MFPUtility 506 in FIG. 5, for example. In the following description, the at-time-of-printing start application 205 may perform each process, but actually, each function is achieved by the CPU 111 executing a corresponding program. All the processing is not necessarily sequentially executed in a single process, and there can also be a case where the processing is transferred to the OS once and called by the OS again. The processing flow is merely a flow simply illustrating the main processing of the at-time-of-printing start application 205 for convenience. In a case where an instruction to display a UI is not given in step S605, the OS skips the UI process illustrated in FIG. 7 and calls an editing and ending process described below.

First, in step S701, the at-time-of-printing start application 205 reads the operation mode saved in step S603 or S606 from the Local Storage. In step S702, the at-time-of-printing start application 205 determines whether the operation mode is the fax driver mode.

In a case where the operation mode is the fax driver mode (YES in step S702), then in step S703, the at-time-of-printing start application 205 configures a user interface for the fax driver. The user interface for the fax driver includes a control item allowing the user to designate a transmission destination and a fax number. The details of the user interface for the fax driver will be described below with reference to FIG. 19.

In step S704, the at-time-of-printing start application 205 receives an input from the user. If an instruction to transmit fax is given on the user interface, then in step S705, the at-time-of-printing start application 205 saves in the Local Storage the transmission destination and the fax number designated by the user.

This is the processing of the at-time-of-printing start application 205 in the fax driver mode. As described above, in the fax driver mode, the at-time-of-printing start application 205 always displays a user interface as an input screen allowing the user to designate the transmission destination and the fax number (see FIG. 19). In the fax driver, the transmission destination and the fax number are transmission destination information essential for transmitting fax. Even if the WSDA 207 or the PEX 209 is configured to allow the user to designate the transmission destination and the fax number, a user interface of the WSDA 207 or the PEX 209 is not always opened when printing is performed. The at-time-of-printing start application 205 allows the user to designate the transmission destination and the fax number, whereby the user can certainly input the destination of the current fax transmission process. Further, a screen of the WSDA 207 or the PEX 209, which is displayed only in a case where the user gives an instruction, may also be configured to allow the user to designate the transmission destination and the fax number. In this manner, even in a case where the at-time-of-printing start application 205 does not start for some reason, it is possible to provide a method for designating the transmission destination and the fax number. If the WSDA 207 or the PEX 209 is configured to allow the user to designate the transmission destination and the fax number, the at-time-of-printing start application 205 may give an instruction to display a UI only in a predetermined case. That is, in a case where the transmission destination and the fax number are included in the PrintTicket, the at-time-of-printing start application 205 gives an instruction to display a UI in step S605. In a case where the transmission destination and the fax number are not included in the PrintTicket, the at-time-of-printing start application 205 does not give an instruction to display a UI in step S605. In this manner, the at-time-of-printing start application can be configured to start only in a case where the user forgets to designate the transmission destination and the fax number in the WSDA 207 or the PEX 209.

In a case where it is determined in step S702 that the operation mode is not the fax driver mode (NO in step S702), then in step S706, the at-time-of-printing start application 205 reads the extension function saved in step S612.

Next, in step S707, the at-time-of-printing start application 205 references the information saved in step S608 and determines whether the print preview is enabled. In a case where the print preview is not enabled (NO in step S707), the processing proceeds to a user interface configuration process in step S713. In a case where the print preview is enabled (YES in step S707), then in step S708, the at-time-of-printing start application 205 acquires the PrintTicket.

Further, in step S709, based on the PrintTicket, the at-time-of-printing start application 205 acquires the PrintCapabilities. Since it takes time to acquire the PrintCapabilities, the configuration may be such that necessary information is saved in the Local Storage in the setup process in FIG. 6, and the saved information is used in step S709.

Next, in step S710, the at-time-of-printing start application 205 analyzes the acquired PrintCapabilities and searches whether a particular function is supported by the PrintCapabilities. Then, the at-time-of-printing start application 205 saves the found function and the setting value described in the PrintTicket, as a driver function in the Local Storage. In this case, as an example, the at-time-of-printing start application 205 searches for two functions, namely the layout function and the sheet type setting, as particular functions. The search process is executed by determining whether Feature having a prescribed name is present in the PrintCapabilities. The extension function saved in step S612 indicates a function that the driver does not have, whereas the driver functions saved in step S710 are functions that the driver has. Thus, if these driver functions are enabled in the PrintTicket, the printer driver 201 can properly execute processing according to the designation of the driver functions.

Next, in step S711, the at-time-of-printing start application 205 acquires the XPS document using the predetermined API of the OS. Further, in step S712, the at-time-of-printing start application 205 analyzes the content of the XPS document and displays the XPS document on the display unit 119. In this process, the at-time-of-printing start application 205 reflects the setting value set in the PrintTicket on a printing result, whereby it is possible to achieve a more accurate print preview.

The XPS document received by the at-time-of-printing start application 205 is generated by the application as the print request source and is data before being processed by the printer driver 201. Accordingly, for example, even if layout printing is designated in the PrintTicket in the XPS document, a layout process is not performed on the XPS document received by the at-time-of-printing start application 205. Taking such a case into account, the at-time-of-printing start application 205 displays on the display unit 119 a print image reflecting print settings according to a logic equivalent to that implemented by a subsequent driver. If the print settings are changed on a user interface displayed by the at-time-of-printing start application 205, the at-time-of-printing start application 205 displays a print image reflecting the changes on the display unit 119 again. In a printer driver that is not provided by the printer vendor, such as the standard printer driver 510, it is not clear according to what logic the print settings are reflected on the XPS document. In this case, the at-time-of-printing start application 205 skips the reflection of the designated function or reflects the designated function according to an original logic, and then displays, on the display unit 119, information indicating that there is a possibility that the printing result is different. Further, regarding an extension function to be provided by the at-time-of-printing start application 205 including also the editing of the XPS document, the at-time-of-printing start application 205 may display on the display unit 119 a print image reflecting the print settings according to the same logic as the actual editing.

Next, in step S713, the at-time-of-printing start application 205 configures a user interface having controls allowing the user to designate the extension function saved in step S612 and the driver function saved in step S710. Items to be displayed as choices of the extension function saved in step S612 are information of "option" in FIG. 15, i.e., items supported by the at-time-of-printing start application 205. Items to be displayed as choices of the driver function saved in step S710 are a list of Options of a corresponding function in the PrintCapabilities. For example, to allow the user to designate a sheet type based on information in the PrintCapabilities 1000, all Options supported by "psk:PageMediaType" (psk:Plain, ns0000:PhotoPaper, and the like) are listed as choices. Although not illustrated in the PrintCapabilities 1000, normally, a "DisplayName" element is present in each Feature and each Option. In the DisplayName, localized appropriate name information is stored. Thus, the at-time-of-printing start application 205 displays the names of the DisplayName as choices of each driver function.

In step S714, the at-time-of-printing start application 205 receives an input from the user. If an instruction to perform printing is given on the user interface, then in step S715, the at-time-of-printing start application 205 saves in the Local Storage the setting value of each function designated by the user. This is the processing of the at-time-of-printing start application 205 in the printer driver mode.

The configuration may be such that the processes of steps S708 to S710 are executed even if it is determined in step S707 that the print preview is not enabled. Consequently, the at-time-of-printing start application 205 urges the user again to check an important print setting that necessarily needs to be confirmed before printing. If necessary, it is possible to provide the user with a method capable of changing the important print setting.

Figure 19:
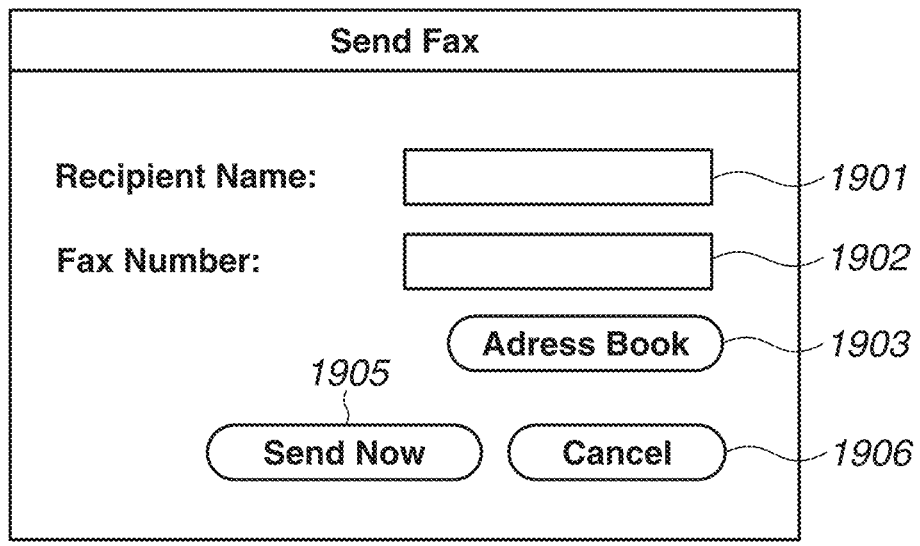
FIG. 19 is a schematic diagram of a user interface of the at-time-of-printing start application when the fax driver is connected.

FIG. 19 is a diagram illustrating an example of a user interface as an input screen displayed in a case where the at-time-of-printing start application 205 operates in the fax driver mode. A display item 1901 is a control item for the user to designate the transmission destination. A display item 1902 is a control item for the user to input the fax number. A display item 1903 is a button for starting an address book. If this button is pressed, the address book is started. The destination is selected on the address book, whereby the transmission destination and the fax number are automatically input. A display item 1905 is a button for starting fax transmission. The user cannot press this button in the state where the transmission destination and the fax number are not input. A display item 1906 is a "cancel" button. If the user presses this button, a subsequent fax transmission process is canceled.

With this configuration, in the fax driver mode, the at-time-of-printing start application 205 can always display a user interface as an input screen allowing the user to designate the transmission destination and the fax number. In the fax driver, the transmission destination and the fax number are information essential for transmitting fax. The at-time-of-printing start application 205 allows the user to designate the transmission destination and the fax number, whereby the user can certainly input the destination of the current fax transmission process.

Figure 20:
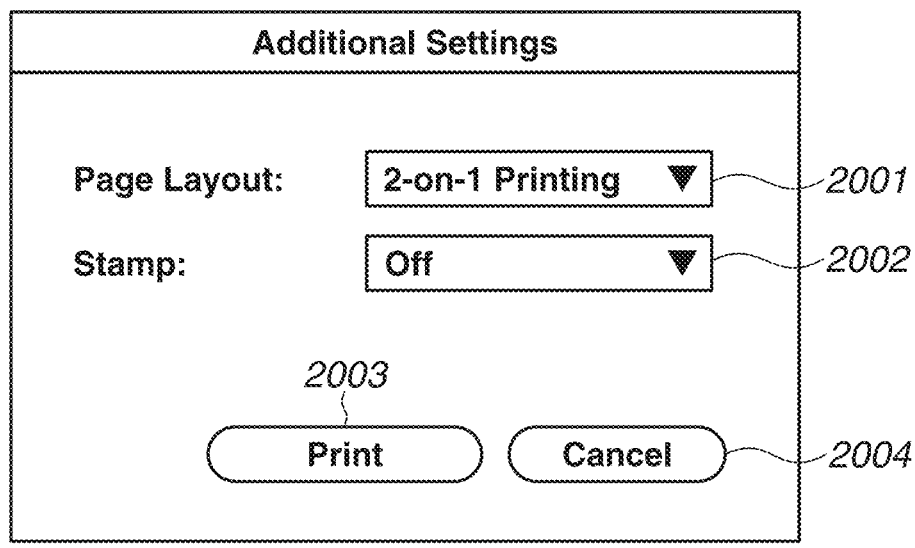
FIG. 20 is a schematic diagram of a user interface of the at-time-of-printing start application when the standard printer driver is connected.

FIG. 20 is an example of a user interface for designating an extension function and displayed in a case where the at-time-of-printing start application 205 operates in the printer driver mode when the standard printer driver 510 operates. In FIG. 20, the print preview function is not enabled. Neither the layout print function nor the stamp function is supported by the PrintCapabilities 1200 of the standard printer driver 510. Thus, in the processes of steps S611 and S612, the at-time-of-printing start application 205 saves two functions, namely the layout print function and the stamp function, as extension functions. As a result, these two functions are provided as extension functions. A display item 2001 is a control item for designating the setting of the layout print function. A display item 2002 is a control item for designating the setting of the stamp function. A display item 2003 is a button for starting printing. A display item 2004 is a "cancel" button. If the user presses this button, a subsequent printing process is canceled. If the operation driver is the common printer driver 509, only the stamp function is displayed as an extension function. This is because the layout function is supported by the PrintCapabilities 1100 of the common printer driver 509.

With this configuration, the at-time-of-printing start application 205 is used in a driver which is provided by Microsoft® similarly to the OS and of which the function cannot be extended by the printer vendor, as in the standard printer driver 510, whereby it is possible to achieve the extension of a print function. Further, information indicating the capability of a driver which operates is determined, and only a missing function is provided as an extension function. Consequently, in a case where there are a plurality of types of printer drivers 201 that can be used, it is possible to provide an optimal extension function for each printer driver 201. Further, the user can control whether a function is to be extended with reference to a user interface displayed when printing is performed. Consequently, it is possible to deal with a use case where it is not desirable to display a user interface each time.

Figure 21:
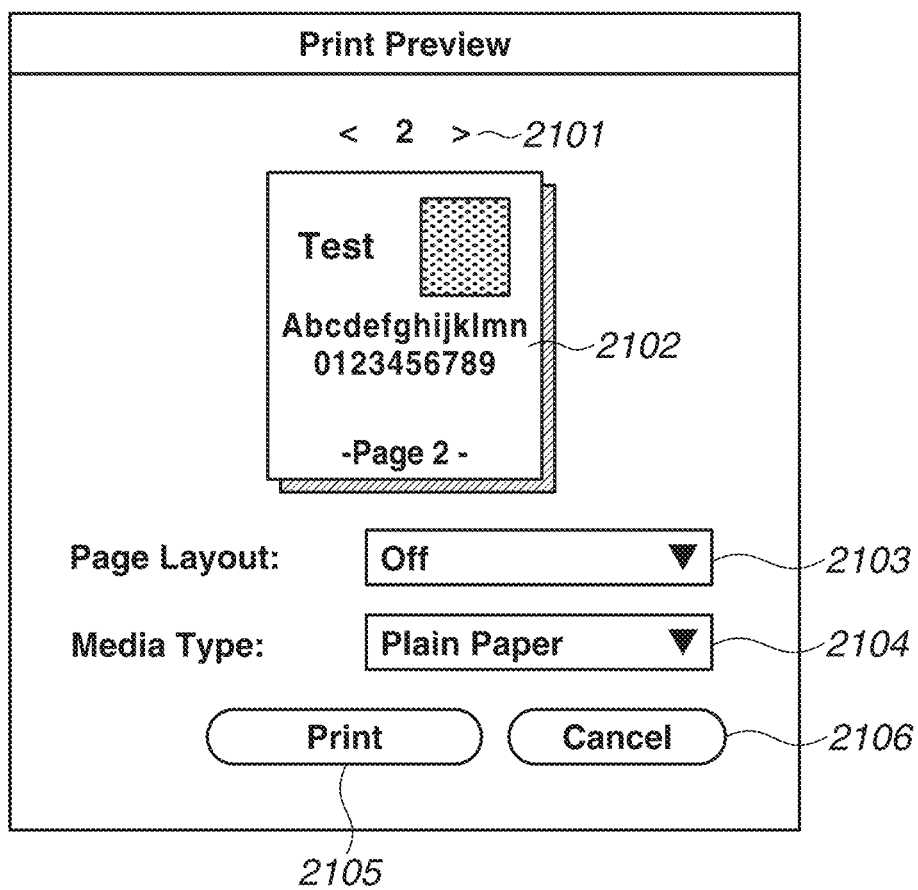
FIG. 21 is a schematic diagram of a user interface of the at-time-of-printing start application when the model-based printer driver is connected.

FIG. 21 is an example of a user interface in a case where the at-time-of-printing start application 205 operates in the printer driver mode when the model-based printer driver 508 operates. The print preview function is enabled. A display item 2101 is a control item for changing a page to be displayed on the print preview. The user can change the display page using this control item and can also further check the total number of pages to be printed based on the current print data and print settings. A display item 2102 is a print preview screen representing an image of the printing result of a designated page. A display item 2103 is a control item for designating the layout print function. A display item 2104 is a control item for designating a sheet type. The display items 2013 and 2014 indicate not extension functions but driver functions. Thus, as described above, selection items are based on the functions of the printer driver 201. A display item 2105 is a button for starting printing. A display item 2106 is a "cancel" button. If the user presses this button, a subsequent printing process is canceled. In FIG. 21, only driver functions are displayed. However, as a result of the processing in FIGS. 6 and 7, if both a driver function and an extension function are enabled, the at-time-of-printing start application 205 displays controls allowing the user to designate all these functions.

With this configuration, based on an XPS document generated by a drawing application and print settings designated by the user, it is possible to achieve a print preview function for displaying a print image close to a printing result before printing. Further, it is also possible for the user to make changes to finally adjust the print settings, while checking a printing result and the number of pages to be printed. With these functions, it is possible to prevent a misprint and also provide a final adjustment method for, for example, performing printing within a desired number of pages.

<Editing and Ending Process for at-Time-of-Printing Start Application>

After the UI process for the at-time-of-printing start application 205 in FIG. 7 ends, the OS calls an editing and ending process for the at-time-of-printing start application 205 in FIG. 8. If the UI display instruction process in step S605 is not executed, the OS calls the editing and ending process without calling the UI process for the at-time-of-printing start application 205 in FIG. 7. This processing procedure is an example of the processing by the at-time-of-printing start application 205 in the configuration of the MFPUtility 506 in FIG. 5, for example. In the following description, the at-time-of-printing start application 205 may perform each process, but actually, each function is achieved by the CPU 111 executing a corresponding program. Further, all the processing is not necessarily sequentially executed in a single process, and there can also be a case where the processing is transferred to the OS once and called by the OS again. The processing procedure is merely a flow simply illustrating the main processing of the at-time-of-printing start application 205 for convenience.

In step S801, the at-time-of-printing start application 205 reads from the Local Storage the operation mode saved in step S603 or S606 and the UI display information saved in step S604. In a case where it is determined in step S802 that a UI is not displayed (NO in step S802), then in step S806, the at-time-of-printing start application 205 acquires the XPS document using the API of the OS. In step S807, the at-time-of-printing start application 205 outputs the XPS document without altering the XPS document at all. As described above, even if the at-time-of-printing start application 205 does not change the XPS document, the at-time-of-printing start application 205 needs to acquire the whole of the XPS document once and output the XPS document. This is the processing of the at-time-of-printing start application 205 in a case where a user interface is not displayed. As described above, if it is determined that it is not necessary to display a user interface, the at-time-of-printing start application 205 does not display a user interface, and the processing ends.

In a case where it is determined in step S802 that a UI is displayed (YES in step S802), then in step S808, based on the information read in step S801, the at-time-of-printing start application 205 determines whether the operation mode is the fax driver mode. In a case where it is determined that the operation mode is the fax driver mode (YES in step S808), then in step S803, the at-time-of-printing start application 205 acquires from the Local Storage the transmission destination and the fax number saved in step S705. Next, in step S804, the at-time-of-printing start application 205 acquires the PrintTicket using the API of the OS. Further, in step S805, the at-time-of-printing start application 205 stores in the PrintTicket the transmission destination and the fax number acquired in step S803.

FIG. 14 illustrates an example of the PrintTicket that stores the above information. In this case, the transmission destination is stored as JobRecipientName, and the fax number is stored as JobFaxNumber. After editing the PrintTicket, the at-time-of-printing start application 205 stores the edited PrintTicket in the XPS document as necessary and then outputs the XPS document, and the processing ends. The fax driver 511 references the PrintTicket, acquires the transmission destination and the fax number, and transmits to the printing apparatus 102 a job to be transmitted by fax to the designated fax number.

In a case where it is determined in step S808 that the operation mode is not the fax driver mode (NO in step S808), the at-time-of-printing start application 205 determines a function to be provided in step S710. Then, in step S809, the at-time-of-printing start application 205 reads from the Local Storage the setting value of the driver function designated by the user using the display item 2104. Next, in step S810, the at-time-of-printing start application 205 determines whether the setting value of the driver function is changed from the initial state.

In a case where it is determined in step S810 that the setting value of the driver function is not changed (NO in step S810), the processing proceeds to step S813. In a case where it is determined in step S810 that the setting value of the driver function is changed (YES in step S810), then in step S811, the at-time-of-printing start application 205 acquires the PrintTicket. In step S812, the at-time-of-printing start application 205 reflects on the PrintTicket the setting value of the driver function acquired in step S809. The configuration of information to be stored in the Local Storage and the reflection method for reflecting the setting value on the PrintTicket for achieving these processes will be described below. If there are a plurality of driver functions of which the setting values are changed, the at-time-of-printing start application 205 performs the reflection process for reflecting the setting values of all the driver functions on the PrintTicket. After reflecting the setting value on the PrintTicket, then in step S813, the at-time-of-printing start application 205 acquires the XPS document.

Next, in step S814, the at-time-of-printing start application 205 reads, from the Local Storage, the setting value of the extension function to be provided according to the determination in step S612 and designated by the user using, for example, the display item 2002. Next, in step S815, the at-time-of-printing start application 205 determines whether the setting value of the extension function is designated. In a case where it is determined in step S815 that the setting value of the extension function is not designated (NO in step S815), then in step S817, the at-time-of-printing start application 205 outputs the XPS document, and the processing ends.

In a case where it is determined in step S815 that the setting value of the extension function is designated (YES in step S815), then according to the extension function designated by the user and the setting value of the extension function, the at-time-of-printing start application 205 edits drawing data in the XPS document. For example, a case is described where a layout print function for laying out two pages on a single page is designated. In this case, the at-time-of-printing start application 205 acquires FixedPage, which is the concept of a page in the drawing data in the XPS document, for two pages and places the drawing data in a reduced manner on the FixedPage of a single page. Based on this, the at-time-of-printing start application 205 deletes the original FixedPage for two pages from the drawing data and adds newly created FixedPage to the drawing data. Such processing is repeatedly executed on all pages. If there are a plurality of designated extension functions, the at-time-of-printing start application 205 generates drawing data reflecting all the designation of the extension functions. Finally, the at-time-of-printing start application 205 outputs the XPS document including the edited drawing data, and the processing ends.

As described above, in a case where the setting value of a driver function supported by the printer driver 201 is changed, the at-time-of-printing start application 205 in this configuration reflects the change on PrintTicket. Then, the at-time-of-printing start application 205 entrusts the printer driver 201 with an editing process for editing drawing data in an XPS document. Consequently, the at-time-of-printing start application 205 can perform high-speed processing without needing to perform an editing process for editing an unnecessary XPS document. Additionally, the function of the printer driver 201 is used, and therefore, it is possible to obtain exactly the same result in a case where the function is designated through the WSDA 207 and a case where the function is designated through the at-time-of-printing start application 205.

Meanwhile, regarding an extension function that is not supported by the printer driver 201, the at-time-of-printing start application 205 itself in this configuration edits drawing data in an XPS document. Consequently, it is possible to provide the user with a function that is not supported by the printer driver 201.

FIG. 16 is a diagram illustrating an example of information stored in the Local Storage. The stored information includes a name and a value. This example indicates that the at-time-of-printing start application 205 operates in the printer driver mode, the stamp function is provided as an extension function, and the layout print function is provided as a driver function. In the process of step S612, information having the name "extension function_PageStamp" and a value of null is added to the Local Storage.

If the stamp function is designated on a user interface of the at-time-of-printing start application 205, the value designated in the process of step S715 is stored as the value of "extension function_PageStamp". In this case, the value is changed to the setting value "Confidential" by the user. Regarding the layout print function as a driver function, in the process of step S710, information having the name "driver function_JobNUpAllDocumentsContiguously" and a value corresponding to an initial value set in the Print-Ticket is added. If the designated value of the layout print function is changed on a user interface of the at-time-of-printing start application 205, the value changed in the process of step S715 is stored. In this case, the value is changed to the setting value "ns0000:PagesPerSheet_2" by the user. This name is Option name defined in the PrintCapabilities of the printer driver 201. As described above, based on the prefix of information stored in the Local Storage, it is possible to determine which of an extension function and a driver function each function is.

In the process of step S810, the at-time-of-printing start application 205 determines whether a driver function starting with the prefix "driver function_" is present in the Local Storage. In the process of step S812, the at-time-of-printing start application 205 reflects Option name stored as a value in the Local Storage as it is on Option name of the Print-Ticket. In the process of step S815, the at-time-of-printing start application 205 determines whether an extension function starting with the prefix "extension function_" is present in the Local Storage.

As described above, in the present embodiment, the configuration can be such that after a print instruction is given by the user (i.e., after an XPS document is output from a drawing application), and before the printing apparatus 102 performs a printing operation, a user interface of the at-time-of-printing start application 205 is displayed. Further, in a case where the at-time-of-printing start application 205 is uniquely assigned to the printing apparatus 102 regardless of the type of the printer driver 201, it is possible to achieve an optimal function extension according to the type of the printer driver 201. If a fax driver is connected, a user interface is displayed as an input screen for inputting a transmission destination and a fax number, which are essential for transmitting fax.

If a printer driver is connected, then according to designation by the user, it is possible to achieve a print preview function for allowing the user to check a printing result on the display unit 119 in advance. Further, it is possible to determine a function based on information indicating the capability of the connected printer driver 201 and provide a missing function as an extension function. Consequently, even in a case where a connected driver is a standard printer driver provided by Microsoft® together with the OS, and the function of the driver cannot be extended by the printer vendor, the printer vendor can extend an original function using the at-time-of-printing start application 205.

In the present embodiment, print previews in the fax driver mode and the printer driver mode and a function extension are achieved by the at-time-of-printing start application 205, which is a single GUI application. These three functions, however, do not need to be implemented in a combined manner. It goes without saying that the at-time-of-printing start application 205 can be configured to have one or two of the three functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Based on the present invention, it is possible to provide an appropriate function according to a driver to be used.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2017-200310, filed Oct. 16, 2017, which is hereby incorporated by reference herein in its entirety.

What is claimed is:

1. A control method for an information processing apparatus which comprises a memory that stores a graphical user interface (GUI) application capable of providing a GUI in a case where a driver that does not have a function of providing a GUI is selected, the control method comprising:
   acquiring, by the GUI application, drawing data generated by a drawing application;
   acquiring, by the GUI application, at least either of setting data including information indicating a setting and capability data including information indicating a capability of the driver;
   determining, by the GUI application, whether first information is included in the at least either of the setting data and the capability data; and
   controlling whether to provide or not provide, by the GUI application, a first display item in accordance with the determination result of whether the first information is included.

2. The control method according to claim 1,
   wherein in a case where as the first information, information indicating that the driver is a fax driver is included in at least either one of the setting data, and the capability data an input screen for allowing a user to input transmission destination information necessary for fax transmission is provided as the first display item, and
   wherein in a case where the information indicating that the driver is the fax driver is not included in at least either one of the setting data, and the capability data, the input screen is not provided.

3. The control method according to claim 2, wherein the setting data is data output together with the drawing data from the drawing application,
   the control method further comprising, based on the transmission destination information input on the input screen, editing, by the GUI application, the setting data.

4. The control method according to claim 1,
   wherein in a case where as the first information, information regarding a predetermined function that can be provided by the GUI application is not included in the capability data, a display item allowing designation of the predetermined function is provided as the first display item, and
   wherein in a case where the information regarding the predetermined function is included in the capability data, the display item is not provided.

5. The control method according to claim 4, further comprising editing, by the GUI application, the drawing data based on information designated on the display item.

6. The control method according to claim 4, wherein the predetermined function is at least either of a stamp function and a page layout function.

7. The control method according to claim 1,
   wherein as the first information, information indicating that a print preview screen is to be displayed is included in the setting data, the print preview screen based on the drawing data is provided as the first display item, and
   wherein the information indicating that the print preview screen is to be displayed is not included in the setting data, the print preview screen is not provided.

8. The control method according to claim 7, further comprising, based on information designated on the print preview screen, editing, by the GUI application, the setting data.

9. The control method according to claim 1, wherein the setting data is PrintTicket.

10. The control method according to claim 1, wherein the setting data is data included in PropertyBag.

11. The control method according to claim 1, wherein the GUI application acquires the drawing data before the driver.

12. The control method according to claim 1,
    wherein according to installation of the driver, metadata is acquired via the Internet by an operating system (OS), and
    wherein based on a description in the acquired metadata, the GUI application is acquired from an application distribution system via the Internet.

13. The control method according to claim 12, wherein the GUI application is associated with a device described in the metadata.

14. The control method according to claim 12, wherein at least one of a plurality of drivers corresponding to a device described in the metadata is installed on the information processing apparatus.

15. The control method according to claim 1, wherein in a case where the driver that does not have the function of providing a GUI is selected, the GUI application provides a GUI based on an instruction from an operating system (OS), and in a case where a driver having a function of providing a GUI is selected, the GUI application is not started.

16. The control method according to claim 1, wherein the driver that does not have the function of providing a GUI is a V4 printer driver.

17. A control method for an information processing apparatus which includes a memory that stores a graphical user interface (GUI) application capable of providing a GUI in a case where a driver that does not have a function of providing a GUI is selected, the control method comprising:
    acquiring, by the GUI application, drawing data generated by a drawing application;
    acquiring, by the GUI application, capability data including information indicating a capability of the driver,
    providing, by the GUI application, an input screen for allowing a user to input transmission destination information necessary for fax transmission, in a case where the capability data includes information regarding a fax,
    acquiring, by the GUI application, setting data including information indicating a setting,
    editing, by the GUI application, the acquired setting data based on the transmission destination information input on the input screen.

18. The control method according to claim 17, wherein the input screen is not provided in a case where the acquired capability data does not include the information regarding a fax.

19. The control method according to claim 17, wherein the edited setting data is stored in XPS data and the XPS data is output by the GUI application.

20. A control method for an information processing apparatus which includes a memory that stores a graphical user interface (GUI) application capable of providing a GUI in a case where a printer driver that does not have a function of providing a GUI is selected, the control method comprising:
    acquiring, by the GUI application, drawing data generated by a drawing application;
    acquiring, by the GUI application, capability data including information indicating a capability of the driver; and
    determining, by the GUI application, a predetermined function that is able to be provided by the GUI application and is not included in the capability data, and providing by the GUI application, a display item allowing designation of the predetermined function based on the determination result.

21. The control method according to claim 20, further comprising, editing, by the GUI application, the drawing data based on the designated predetermined function.

22. A control method for an information processing apparatus which includes a memory that stores a graphical user interface (GUI) application capable of providing a GUI in a case where a printer driver that does not have a function of providing a GUI is selected, the control method comprising:
   acquiring, by the GUI application, drawing data generated by a drawing application;
   acquiring, by the GUI application, setting data including information indicating a setting,
   determining, by the GUI application, whether the setting data includes information for displaying a print preview screen; and
   in a case where the setting data includes the information for displaying the print preview screen, providing, by the GUI application, the print preview screen based on the drawing data.

23. The control method according to claim 22, further comprising, based on information specified on the print preview screen, editing the setting data output together with the drawing data from the drawing application.

24. The control method according to claim 22,
   wherein an instruction to display the print preview screen is issued on a setting screen displayed before the drawing data is output from the drawing application according to a print request, and
   wherein after the drawing data is output from the drawing application according to the print request, the print preview screen is provided.

* * * * *